(12) United States Patent
Lert, Jr. et al.

(10) Patent No.: US 12,378,077 B2
(45) Date of Patent: Aug. 5, 2025

(54) AUTOMATED DECANT SYSTEM

(71) Applicant: Symbotic LLC, Wilmington, MA (US)

(72) Inventors: John G. Lert, Jr., Wakefield, MA (US); William J. Fosnight, Windham, NH (US); Mark Solomon, Lexington, MA (US); Julian Warhurst, Portsmough, RI (US); Mark Supernor, Auburn, NH (US); Nathan Stallings, Chester, NH (US)

(73) Assignee: Symbotic LLC, Wilmington, MA (US)

( * ) Notice: Subject to any disclaimer, the term of this patent is extended or adjusted under 35 U.S.C. 154(b) by 724 days.

(21) Appl. No.: 17/686,102

(22) Filed: Mar. 3, 2022

(65) Prior Publication Data
US 2022/0281685 A1 Sep. 8, 2022

Related U.S. Application Data

(60) Provisional application No. 63/156,296, filed on Mar. 3, 2021.

(51) Int. Cl.
*B65G 1/137* (2006.01)
*B65B 69/00* (2006.01)
*B65G 61/00* (2006.01)
*B65G 65/23* (2006.01)

(52) U.S. Cl.
CPC ........ *B65G 1/1373* (2013.01); *B65B 69/0033* (2013.01); *B65G 61/00* (2013.01); *B65G 65/23* (2013.01); *B65G 2201/0258* (2013.01)

(58) Field of Classification Search
CPC ...... B65G 1/1373; B65G 61/00; B65G 65/23; B65G 2201/0258; B65G 1/06; B65G 1/0485; B65B 69/0033
See application file for complete search history.

(56) References Cited

U.S. PATENT DOCUMENTS

| | | | |
|---|---|---|---|
| 5,179,329 | A | 1/1993 | Nishikawa et al. |
| 5,386,677 | A | 2/1995 | Kobuki et al. |
| 5,472,309 | A | 12/1995 | Bernard et al. |
| 5,642,976 | A | 7/1997 | Konstant |
| 6,264,422 | B1 | 7/2001 | Hennes et al. |
| 6,289,260 | B1 | 9/2001 | Bradley et al. |

(Continued)

FOREIGN PATENT DOCUMENTS

| | | |
|---|---|---|
| AU | 549775 | 2/1986 |
| DE | 4022120 | 1/1992 |

(Continued)

OTHER PUBLICATIONS

English language Abstract for WO2017064401 published Apr. 20, 2017.

(Continued)

*Primary Examiner* — Thomas Randazzo
(74) *Attorney, Agent, or Firm* — Perman & Green, LLP

(57) ABSTRACT

An automated storage and retrieval facility includes an automated decant system for decanting cases of eaches received from manufacturers or others. The automated decant system includes a decant workstation which receives the cases of eaches, cuts and removes the packaging of the cases. Once case packaging has been removed, the decant workstation separates and organizes the eaches, and drops them into totes waiting beneath the workstation.

25 Claims, 34 Drawing Sheets

(56) References Cited

U.S. PATENT DOCUMENTS

| | | |
|---|---|---|
| 7,591,630 B2 | 9/2009 | Lert, Jr. |
| 7,861,844 B2 | 1/2011 | Hayduchok et al. |
| 7,894,932 B2 | 2/2011 | Mountz et al. |
| 7,894,933 B2 | 2/2011 | Mountz et al. |
| 7,991,505 B2 | 8/2011 | Lert, Jr. et al. |
| 8,104,601 B2 | 1/2012 | Hayduchok et al. |
| 8,276,740 B2 | 10/2012 | Hayduchok et al. |
| 8,311,902 B2 | 11/2012 | Mountz et al. |
| 8,425,173 B2 | 4/2013 | Lert et al. |
| 8,447,665 B1 | 5/2013 | Schoenharl et al. |
| 8,483,869 B2 | 7/2013 | Wurman et al. |
| 8,527,325 B1 | 9/2013 | Atreya et al. |
| 8,594,835 B2 | 11/2013 | Lert |
| 8,622,194 B2 | 1/2014 | DeWitt et al. |
| 8,626,335 B2 | 1/2014 | Wurman et al. |
| 8,694,152 B2 | 4/2014 | Cyrulik et al. |
| 8,718,814 B1 | 5/2014 | Clark et al. |
| 8,740,538 B2 | 6/2014 | Lert et al. |
| 8,831,984 B2 | 9/2014 | Hoffman et al. |
| 8,892,240 B1 | 11/2014 | Vliet et al. |
| 8,965,562 B1 | 2/2015 | Wurman et al. |
| 8,972,045 B1 | 3/2015 | Mountz et al. |
| 8,983,647 B1 | 3/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,020,632 B2 | 4/2015 | Naylor |
| 9,037,286 B2 | 5/2015 | Lert |
| 9,051,120 B2 | 6/2015 | Lert et al. |
| 9,096,375 B2 | 8/2015 | Lert et al. |
| 9,111,251 B1 | 8/2015 | Brazeau |
| 9,129,250 B1 | 9/2015 | Sestini et al. |
| 9,139,363 B2 | 9/2015 | Lert |
| 9,242,798 B2 | 1/2016 | Guan |
| 9,260,245 B2 | 2/2016 | Este et al. |
| 9,321,591 B2 | 4/2016 | Lert et al. |
| 9,330,373 B2 | 5/2016 | Mountz et al. |
| 9,334,113 B2 | 5/2016 | Naylor |
| 9,334,116 B2 | 5/2016 | DeWitt et al. |
| 9,378,482 B1 | 6/2016 | Pikler et al. |
| 9,423,796 B2 | 8/2016 | Sullivan et al. |
| 9,428,295 B2 | 8/2016 | Miet et al. |
| 9,826,213 B1 | 11/2017 | Russell et al. |
| 10,793,355 B1 | 10/2020 | Garcia et al. |
| 2005/0047895 A1 | 3/2005 | Lert |
| 2006/0080819 A1 | 4/2006 | McAllister |
| 2006/0257236 A1 | 11/2006 | Stingel, III et al. |
| 2007/0127691 A1 | 6/2007 | Lert |
| 2010/0076591 A1 | 3/2010 | Lert, Jr. |
| 2010/0146907 A1 | 6/2010 | Fritzsche et al. |
| 2010/0316468 A1 | 12/2010 | Lert et al. |
| 2010/0316469 A1 | 12/2010 | Lert et al. |
| 2010/0316470 A1 | 12/2010 | Lert et al. |
| 2010/0322746 A1 | 12/2010 | Lert |
| 2010/0322747 A1 | 12/2010 | Lert et al. |
| 2011/0076128 A1 | 3/2011 | Johnsen et al. |
| 2012/0101627 A1 | 4/2012 | Lert |
| 2012/0186942 A1 | 7/2012 | Toebes et al. |
| 2012/0195720 A1 | 8/2012 | Sullivan et al. |
| 2013/0246229 A1 | 9/2013 | Mountz et al. |
| 2014/0088758 A1 | 3/2014 | Lert et al. |
| 2014/0212249 A1 | 7/2014 | Kawano |
| 2014/0271063 A1 | 9/2014 | Lert et al. |
| 2014/0288696 A1 | 9/2014 | Lert |
| 2014/0308098 A1 | 10/2014 | Lert et al. |
| 2015/0266672 A1 | 9/2015 | Lert et al. |
| 2015/0286967 A1 | 10/2015 | Lert et al. |
| 2015/0375938 A9 | 12/2015 | Lert et al. |
| 2016/0016733 A1 | 1/2016 | Lert |
| 2016/0075512 A1 | 3/2016 | Lert |
| 2016/0140488 A1 | 5/2016 | Lindbo |
| 2017/0043953 A1 | 2/2017 | Battles et al. |
| 2017/0158430 A1 | 6/2017 | Raizer |
| 2017/0225812 A1 | 8/2017 | Johnsen et al. |
| 2017/0267452 A1 | 9/2017 | Goren et al. |
| 2017/0297820 A1 | 10/2017 | Grinnell et al. |
| 2017/0313514 A1 | 11/2017 | Lert, Jr. et al. |
| 2017/0330142 A1 | 11/2017 | Kanellos et al. |
| 2018/0029797 A1 | 2/2018 | Hance et al. |
| 2018/0141754 A1 | 5/2018 | Garrett et al. |
| 2019/0152634 A1 | 5/2019 | Almogy et al. |
| 2020/0039746 A1* | 2/2020 | Lert, Jr. ............... G06Q 10/08 |
| 2020/0306973 A1* | 10/2020 | Edwards ............... B25J 9/1694 |
| 2020/0339298 A1 | 10/2020 | Edwards et al. |
| 2021/0047132 A1 | 2/2021 | Sines et al. |
| 2021/0130025 A1* | 5/2021 | Schaafsma .............. B26D 1/01 |
| 2021/0155414 A1 | 5/2021 | Zhao et al. |
| 2021/0380341 A1* | 12/2021 | Dugat ................... B65G 61/00 |
| 2022/0081213 A1* | 3/2022 | Lert, Jr. ............. B65B 69/0025 |
| 2022/0219857 A1* | 7/2022 | Tsujimori ............. B25J 15/009 |

FOREIGN PATENT DOCUMENTS

| | | |
|---|---|---|
| DE | 4329180 | 3/1995 |
| EP | 0404272 | 12/1990 |
| EP | 0839108 | 7/1995 |
| EP | 2650237 | 11/2014 |
| EP | 2651786 | 5/2016 |
| EP | 2651787 | 5/2016 |
| FR | 2464222 | 3/1981 |
| JP | H0285125 | 3/1990 |
| JP | 2002080007 | 3/2002 |
| WO | 2005097550 | 10/2005 |
| WO | 2010125111 | 11/2010 |
| WO | 2016172793 | 11/2016 |
| WO | 2016199033 | 12/2016 |
| WO | 2017064401 | 4/2017 |

OTHER PUBLICATIONS

English language Abstract for JPH0285125 published Mar. 23, 1990.
English language Abstract for DE4329180 published Mar. 2, 1995.
International Search Report and Written Opinion dated Nov. 28, 2019 in International Patent Application No. PCT/US2019/044934.
Response to Office Action dated Sep. 17, 2021 in European Patent Application No. 19762251.7.
Notice of Allowance and Fee(s) Due dated Jul. 28, 2021 in U.S. Appl. No. 16/530,249.
Amendment Under 37 C.F.R. 1.312 dated Oct. 14, 2021 in U.S. Appl. No. 16/530,249.
Notice of Allowability dated Oct. 27, 2021 in U.S. Appl. No. 16/530,249.
Office Action dated Feb. 9, 2022 in Japanese Patent Application No. 2021-505823.
Invitation to Pay Additional Fees and Partial International Search Results in International Patent Application No. PCT/US2022/018802.
English language Abstract for FR2464222 published Mar. 6, 1981.
International Search Report and Written Opinion dated Oct. 7, 2022 in International Patent Application No. PCT/US2022/018802.
English language Abstract for DE4022120 published Jan. 16, 1992.
Office Action dated Oct. 24, 2022, in Japanese Patent Application No. 2021-505823.
Response to Office Action, with English translation of claims as amended therein, dated Aug. 9, 2022, in Japanese Patent Application No. 2021-505823.
Notice of Appeal, Appeal Brief and Amendment dated Feb. 28, 2023, with English translation of claims as amended, in Japanese Patent Application No. 2021-505823.

* cited by examiner

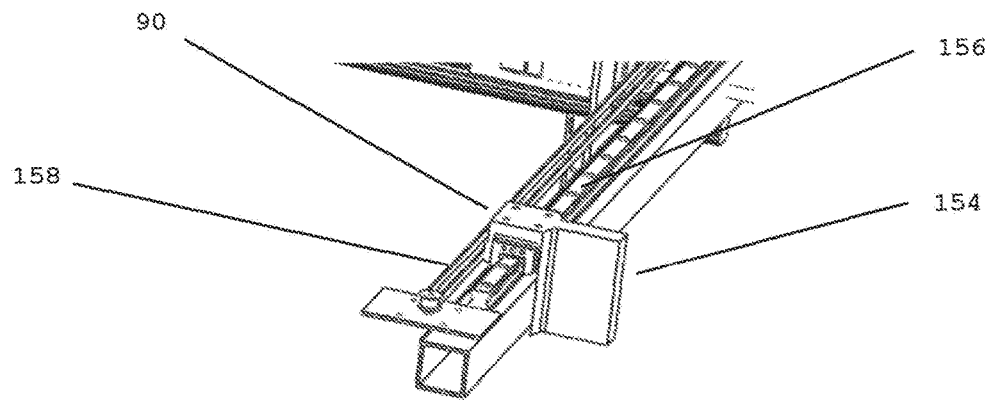
Fig. 4
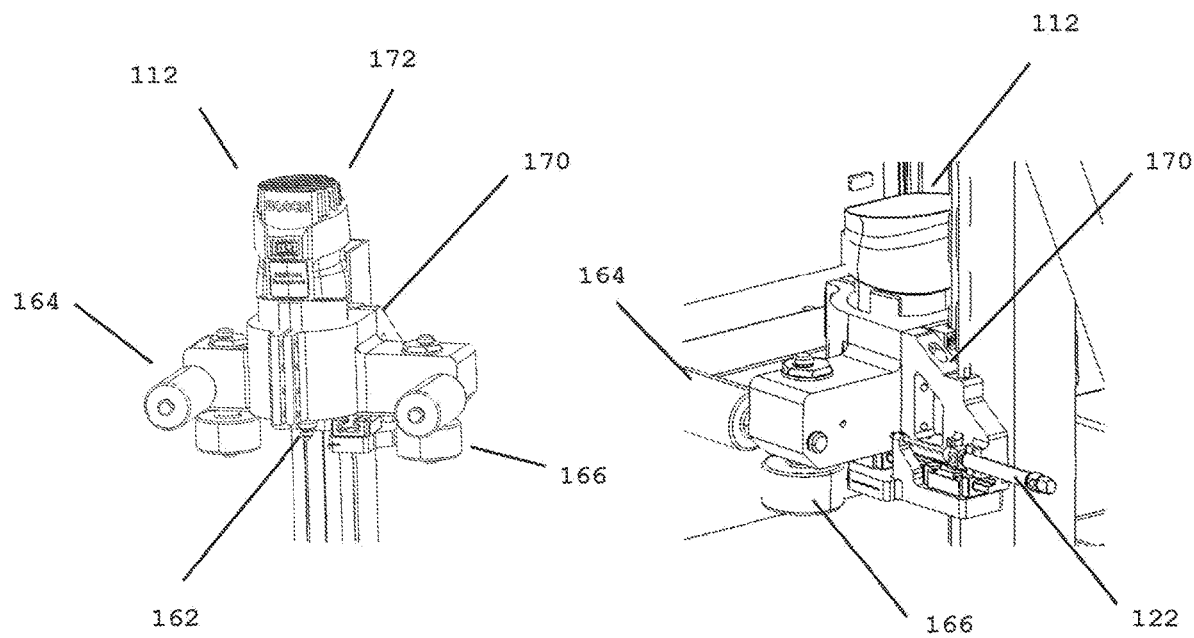
Fig 5A
Fig. 5B

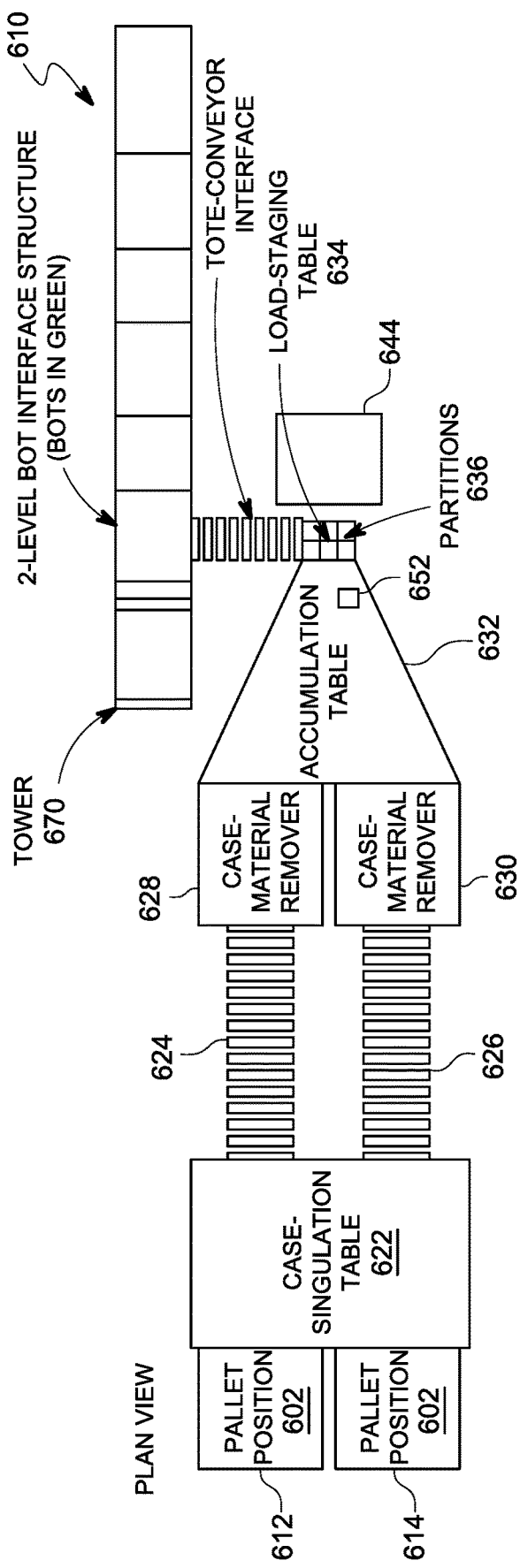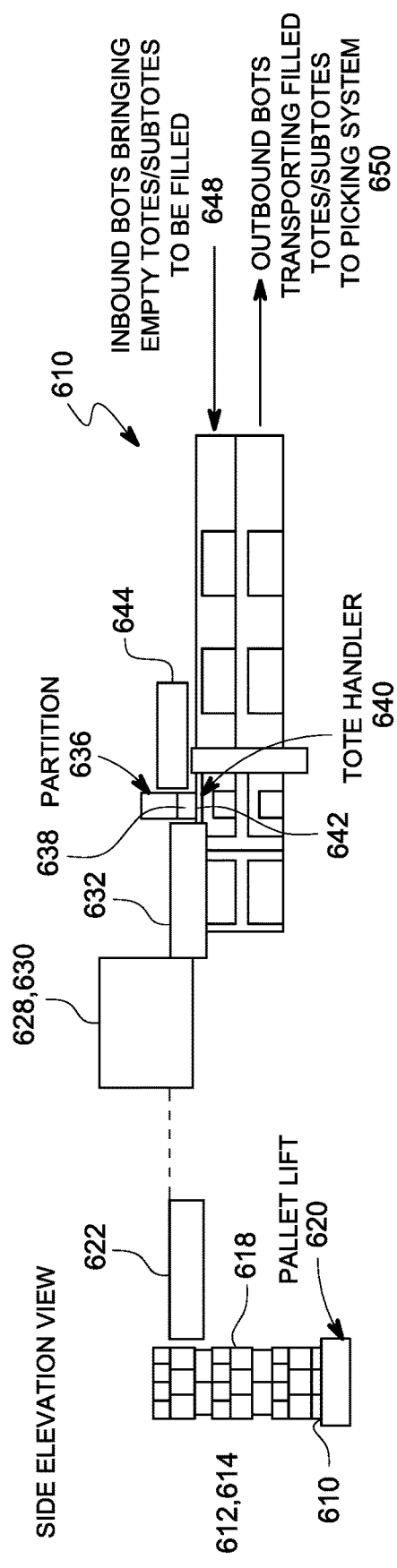
FIG. 18A
FIG. 18B

AUTOMATED DECANT SYSTEM

PRIORITY DATA

The present application claims priority to U.S. Provisional Patent Application No. 63/156,296, filed on Mar. 3, 2021, entitled "Automated Decant System", which application is incorporated by reference herein in its entirety.

BACKGROUND

An order-fulfillment system for use in supply chains, for example in retail supply chains, may fulfill orders for individual product units, referred to herein as "eaches" (also called "pieces", "inventory", "items" or, generally, any articles available for purchase in retail as a purchase unit, etc.). Eaches are typically packaged and shipped by the manufacturer to a distributor in cases. Eaches may be shipped from the distributor to a retail store in the same cases. However, often there is a need to open and breakdown cases to ship one or some eaches from a case to a retail store or individual consumer.

SUMMARY

The present technology, roughly described, relates to an automated storage and retrieval facility comprising an automated decant system for decanting cases of eaches received from manufacturers or others. The automated decant system includes a decant workstation which receives the cases of eaches. The workstation includes package cutting, stripping and removal assemblies for removing case packaging. Once case packaging has been removed, the decant workstation further includes an each-separator module and a drop-catch module for separating eaches into predetermined groups, and dropping the groups into totes. The totes may then travel from the decant workstation to storage locations where the totes may be stored until needed to fulfill orders.

In one example, the present technology relates to a system for decanting cases of eaches in a supply chain, the system comprising: a work surface configured to receive a case of eaches; a separation module configured to receive eaches after removal of the case, the separation module further configured to separate and organize eaches for delivery to one or more totes.

In a further example, the present technology relates to a system for decanting cases of eaches in a supply chain, the system comprising: a work surface configured to receive a case of eaches; one or more cutting modules configured to cut one or more edges of the case to provide access to the eaches within the case; an inversion module configured to rotate eaches and allow removal of a portion of the case on which the eaches were supported prior to rotation; a separation module configured to separate and organize eaches after separation from the case; and a drop catch module configured to support a tote and receive eaches from the separation module.

In another example, the present technology relates to a method of decanting cases of eaches in a supply chain, the method comprising: a) receiving a case of goods on a support table; b) cutting edges of the case; c) removing a first portion of the case; d) inverting the eaches and remaining portion of the case; e) removing the remaining portion of the case; f) separating the eaches based on one or more totes into which the eaches are to be transferred; and g) transferring the eaches into the one or more totes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present technology will be described with reference to the following figures.

FIG. 4 is an isometric view of a pusher portion of the edge cutting module according to embodiments of the present technology.

FIG. 5A-5B are isometric views of a router head portion of the edge cutting module according to embodiments of the present technology.

FIGS. 18A and 18B are plan and side elevation views of an automated decant workstation according to embodiments of the present technology.

DESCRIPTION

The disclosed embodiment may be described as an automated decant system for use in supply chains, for example in retail supply chains. The embodiment is disclosed for automated decant of cases of eaches into totes where the cases are comprised of products received from manufacturers or for fulfilling orders for discrete product units contained in such cases, referred to herein as "eaches" (other commonly used synonyms include "pieces", "articles", "items"), or generally any articles ordered by stores or individual consumers in less-than-case quantities. While the embodiment can be used in other applications, such as storage and retrieval of parts and work-in-process within manufacturing operations, one field of use is order-fulfillment in retail supply chains.

The disclosed embodiment may contain features as disclosed in U.S. patent application Ser. No. 16/530,249 having United States Patent Publication Number US2020/0039746A1 entitled "Automated Decant System" and having a file date of Aug. 2, 2019. The disclosure of said patent application is hereby incorporated by reference in its entirety.

The disclosed embodiment may interface with automated storage and retrieval systems, picking systems described below or otherwise as disclosed in U.S. Pat. No. 10,179,700 issued Jan. 15, 2019 and entitled "Automated System for Transferring Payloads", U.S. Pat. No. 10,435,241 issued Oct. 8, 2019 and entitled "Storage and Retrieval System", United States Patent Publication Number US2017/0313514A1 entitled "Automated Decant System" and having a publication date of Nov. 2, 2017, the disclosure of all of said patent publications hereby incorporated by reference in their entirety.

The disclosed embodiment may interface with automation or other suitable features of systems as described below or otherwise as disclosed in United States Patent Publication Number US2018/0194556A1 entitled "Interchangeable Automated Mobile Robots with a Plurality of Operating Modes Configuring a Plurality of Different Robot Task Assignments" and having a publication date of Jul. 12, 2018, in United States Patent Publication Number US2018/0150793A1 entitled "Automated Retail Supply Chain and Inventory Management System" and having a publication date of May 31, 2018, in United States Patent Publication Number US2018/0247257A1 entitled "Inventory Management System and Method" and having a publication date of Aug. 30, 2018, the disclosure of all of said patent publications hereby incorporated by reference in their entirety.

Figure 1:
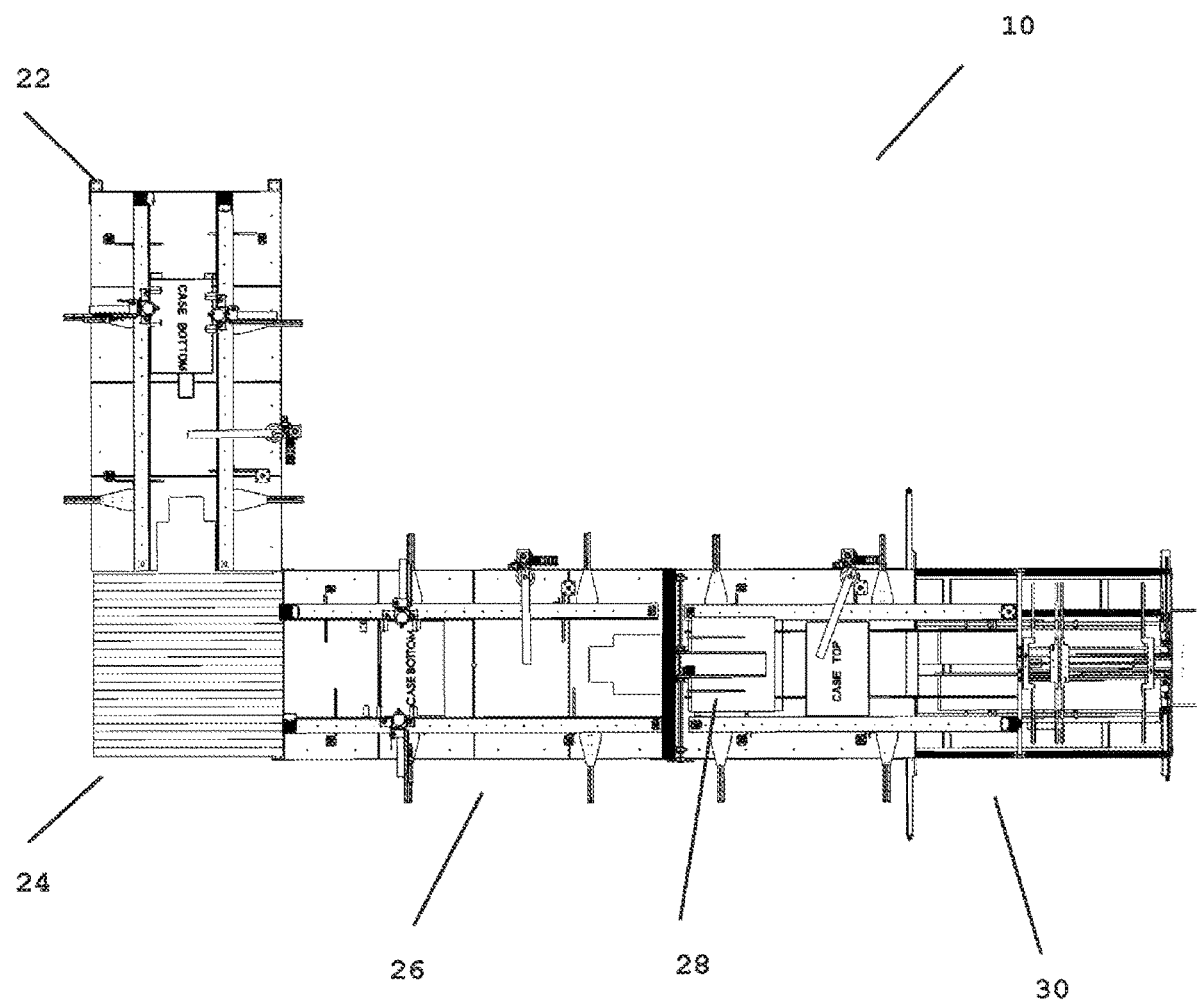
FIG. 1 is a plan view of an automated decant workstation according to embodiments of the present technology.
Figure 2A:
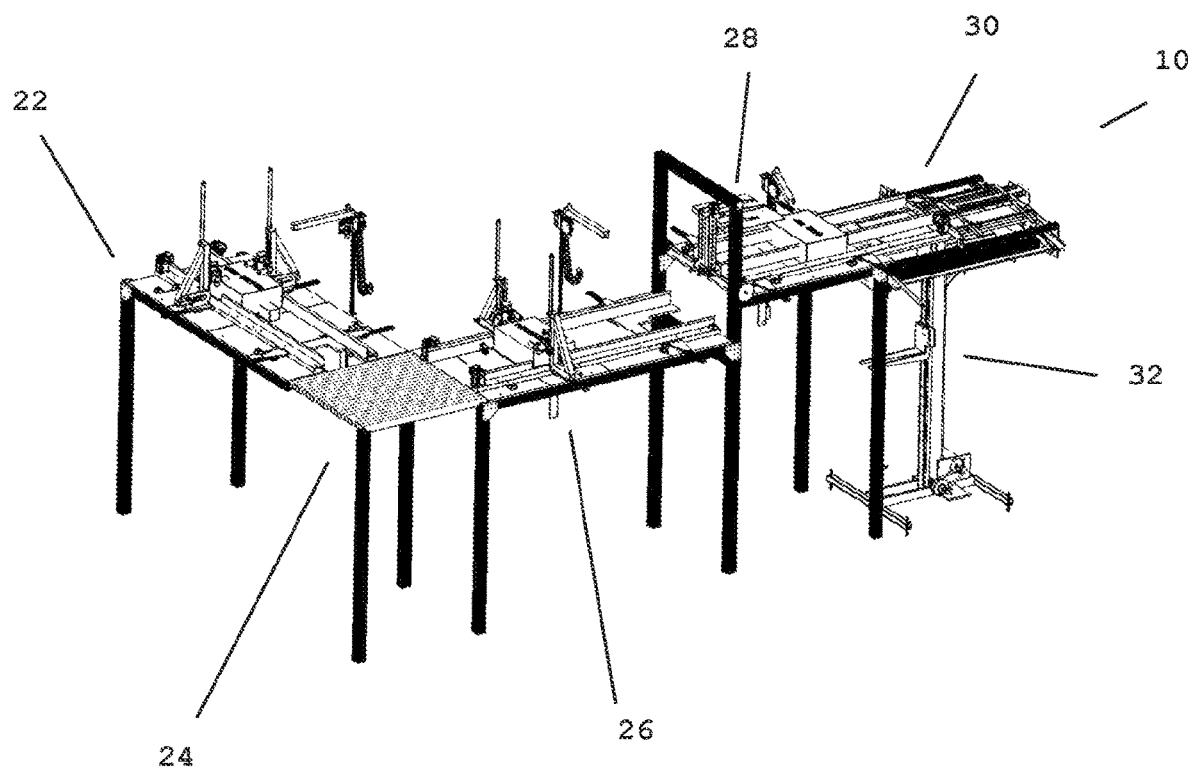
FIGS. 2A-2B are isometric views of an automated decant workstation according to embodiments of the present technology.
Figure 2B:
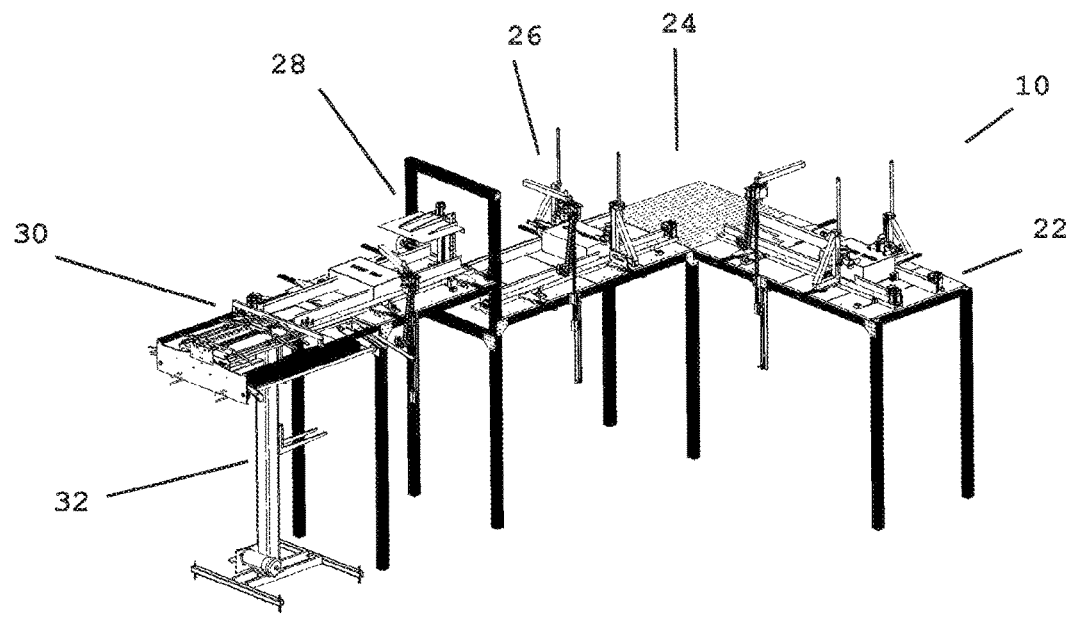
Figure 3:
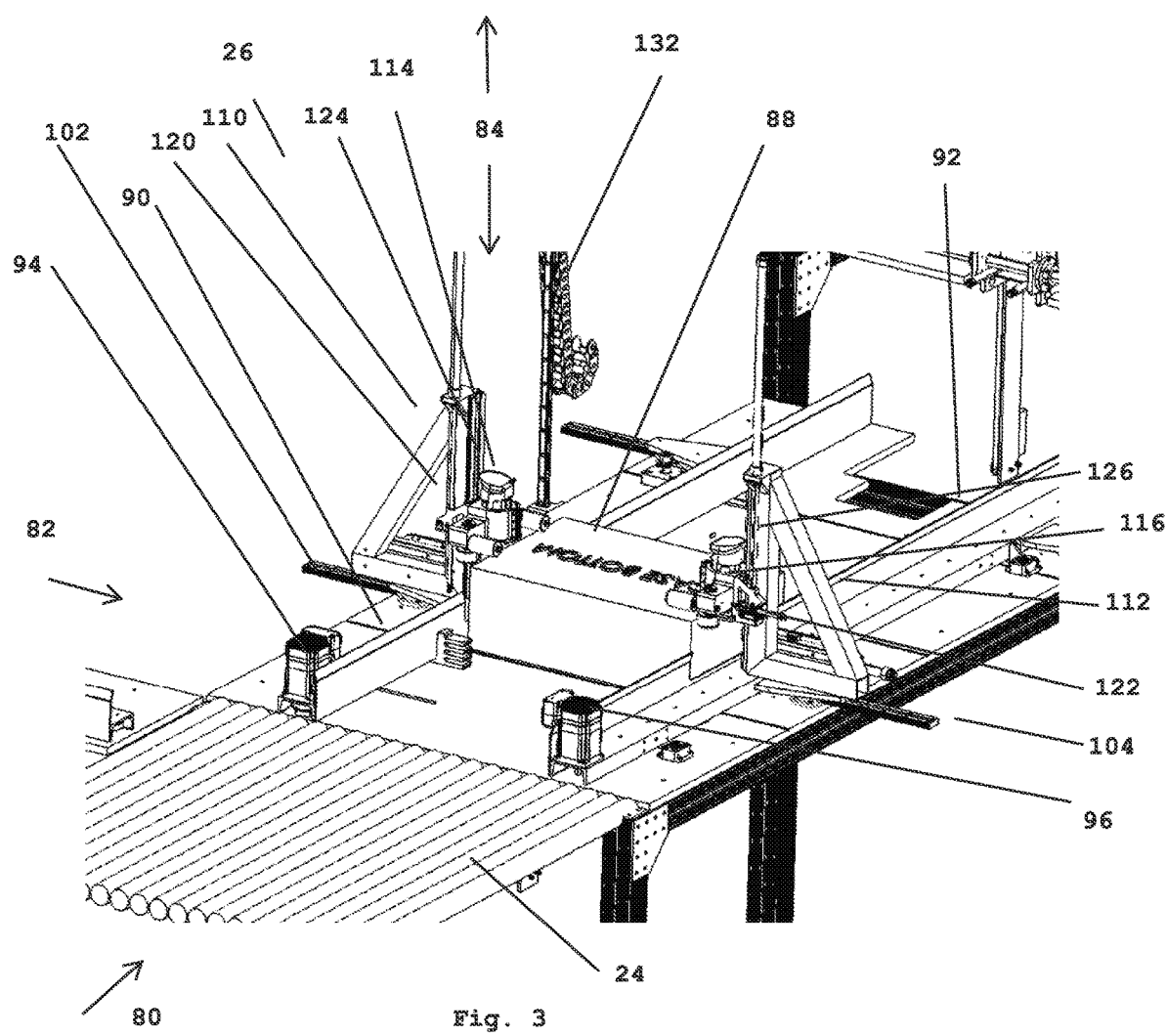
FIG. 3 is an isometric view of an edge cutting module of the automated decant workstation according to embodiments of the present technology.

FIGS. 1-3 are various views of an automated decant workstation according to embodiments of the present technology. It is understood that the decant workstation may have other configurations. For example, further details of a decant workstation for use in the present technology are further explained below with reference to FIGS. 18A-19D. Referring to FIG. 1, there is shown a plan view of an automated decant workstation 10. Referring also to FIG. 2A, there is shown an isometric view of an automated decant workstation 10. Referring also to FIG. 2B, there is shown an isometric view of an automated decant workstation 10. Workstation 10 has edge cutting module 22, right angle conveyor 24, edge cutting module 26, inverter module 28, separation module 30 and drop catch module 32. First edge cutting module 22 accepts cases where incoming cases are staged and fed into first edge cutting module 22 where edges of cases are cut. The outfeed of first edge cutting module 22 provides cases to a two-dimensional case conveyor 24 that feeds second edge cutting module 26 where incoming cases that have had edges cut by module 22 are staged from first direction and then fed in second direction into second edge cutting module 26 where edges of cases are cut. Upon exit of second edge cutting module 26, the peripheral edges of cases have been removed allowing the case material (cardboard, shrink wrap or otherwise) to effectively be removed exposing the eaches for decant downstream into totes. Module 26 further has case packaging removal module. Case packaging removal module receives cases with the peripheral edges of cases removed and removes case material, exposing the underlying eaches where the case material is removed by trash conveyor (not shown). The outfeed of second edge cutting module 26 provides cases to case inversion module 28. Case inversion module 28 accepts and clamps the incoming case from second edge cutting module 26 and rotates the case towards separation module 30 where the case is then unclamped and pushed away from the inversion module 28, for example as shown in FIG. 1. When the case clears inversion module 28, inversion module 28 can rotate back toward the second edge cutting module 26 to receive another case. Similarly, module 30 further has case packaging removal module. Case packaging removal module receives cases with the lower packaging removed and can now remove the remaining case material from the top, exposing the underlying eaches where the case material is removed by trash conveyor (not shown). At this stage, all external case material has been removed exposing the eaches without case packaging and each separation module 30 may organize the eaches in position suitable for deposition into totes under the each separation module 30 where drop catch module 32 is provided to receive the eaches in the tote without damage.

Referring now to FIG. 3, there is shown an isometric view of an edge cutting module 26 of the automated decant workstation 10. Incoming cases are staged and fed in direction 80 into second edge cutting module where edges of cases are cut. First edge cutting module 22 provides where edges of cases are cut in direction 82 and may have features similar to second edge cutting module 26 but where second edge cutting module is arranged to cut edges in direction 80. Second edge cutting module 26 is coupled to right angle conveyor 24 which selectively drives case 88 in direction 82 after case 88 is processed in edge cutting module 22 and then in direction 80 such that case 88 can be processed by module 26. Sensors may be provided where sensors may be cameras, optical sensors or any suitable sensor to detect leading and trailing edges of case as well as sides, height and type of case as needed. First and second pusher guides 90, 92 and are selectively moveable and positionable positively or negatively in direction 80 by actuators 94, 96 where actuators 94, 96 may be stepper driven screws, belt drive or any suitable actuator. Similarly first and second pusher guides 90, 92 and are selectively moveable and positionable positively or negatively in direction 82 by actuators 102, 104 where actuators 102, 104 may be stepper driven screws, belt drive or any suitable actuator. Here, first and second pusher guides 90, 92 utilize actuators 102, 104 to engage the sides of the case 88 such that case 88 is guided through module 26 in a manner so as to be constrained in direction 82 but free to be pushed through module 26 in direction 80 linearly without rotation of case 88. Further, first and second pusher guides 90, 92 utilize actuators 94, 96 to engage the trailing side of the case 88 such that case 88 is pushed through module 26 in a manner so as to be constrained in direction 82 but free to be pushed through module 26 in direction 80 linearly utilizing actuators 94, 96 to urge case 88 through module 26.

Cutters or router modules 110, 112 are also provided as described with respect to the cutting tool as will be shown in FIG. 5 where cutters may be employed alone or in combination with each other to cut case material, for example cardboard or plastic shrink wrap or otherwise. Here, cutters or routers 114, 116 may be independently positionable with respect to first and second guides 90, 92, for example in directions 84 and 82 (positively or negatively) automatically or otherwise where the location and depth of cut may be set by recipe or type of case to be processed. Here, routers 114, 116 may be independently positionable in direction 84 (positively or negatively) automatically utilizing actuators 120, 122 which may employ guides and a linear drive that may be servo driven, stepper driven belt or screw drives. Alternately, any suitable positioning may be provided such that routers 114, 116 engage the outer edges of case from direction 84. Similarly, routers 114, 116 may be independently positionable in direction 82 (positively or negatively) automatically utilizing actuators 124, 126 which may employ guides and a linear drive that may be servo driven, stepper driven belt or screw drives. Alternately, any suitable positioning may be provided such that routers 114, 116 engage the outer edges of case 88 from direction 82. In this manner first and second guides 90, 92 urge case 88 in direction 80 where routers 114, 116 engage the outer edges of case 88 to cut the outer edges of case 88. Here, edge cutting module 22 cuts a first pair of the outer edges of case 88 and after proceeding past right angle conveyor 24 edge cutting module 26 cuts a second pair of the outer edges of case 88 such that the top (or bottom as the case may be as a function of how the case was placed into cutting module 22) of case 88 may now be removed exposing the eaches contained therein. With the top of case 88 now ready to be removed, guides 90, 92 urge case 88 in direction 80 to a position where suction arm 132 can remove the top and place it onto a separate conveyor (not shown) for trash or recycling. With the top of case 88 now removed, guides 90, 92 urge case 88 in direction 80 to box inversion module 28.

Referring now to FIG. 4, there is shown an isometric view of a pusher portion 90 of the edge cutting module 24. Pusher portion 90 has pusher block 154 guided on rail 156 and driven by belt 158. Here, pusher block 154 engages the trailing edge of case 88 to urge case 88 past the router heads, to the detrash arm and then to the inversion module 28.

Referring now to FIG. 5, there is shown an isometric view of a router head portion 112 of the edge cutting module 26. Case packaging cutter router head portion 112 has a cutter head or bit 162 that may be a fixed or rotating razor edge, bit or other cutter suitable for cutting through plastic shrink-wrap, cardboard or shrink-wrap only without cutting the underlying cardboard or product that is subject to the shrink-wrap. The cutter may act passively on springs in order to cooperate with damaged and deformed cases. A vacuum device may be provided to collect dust and cut residue. Rollers 164, 166 are provided slightly recessed, for example 0.005-0.030" or any suitable depth, such that when rollers 164, 166 are depressed against top and side surfaces of case 88, blade 162 pierces plastic wrap and cardboard of case. As case 88 is moved horizontally in direction 80 parallel to the tangent faces of rollers 164, 166, the shrink wrap is cut the length of case. Rollers 164, 166 and blade or bit 162 are mounted with router motor 172 to a frame 170 which may be movably supported as described. Frame 170 may further be movable or compliant such as with a spring load such that surface imperfections and discontinuities in box surface will not affect cutting of the shrink-wrap. Router bit 162 may have a radiused cutting edge that rotates about the router spin axis where bit cuts completely through the cardboard bottom and side. Bit 162 may be set to only partially cut through a folded cardboard base and is configured to completely miss eaches so as not to damage them. Similarly, router bit 162 may have a flat conical cutting edge that rotates about router spin axis where bit cuts completely through cardboard bottom and side. Bit 162 may be set to only partially cut through a folded cardboard base and completely miss eaches so as not to damage them. By way of example, bit 162 may be implemented as a blade or otherwise utilized as disclosed in co-pending U.S. patent application Ser. No. 16/530,249 having United States Patent Publication Number US2020/0039746A1 entitled "Automated Decant System" and having a file date of Aug. 2, 2019. The disclosure of said patent application is hereby incorporated by reference in its entirety. Although not shown, router bit 162 and/or router 172 may further be positionable manually or automatically relative to rollers 164, 166 and or frame 170 to account for different packaging types (plastic wrap, cardboard etc.). Upon completion of the case material removal or case stripping at suction arm station 132, the exposed eaches may be advanced to an accumulation table that organizes the eaches in positions suitable for deposition into totes. Such an accumulation or load staging table is described with respects to FIGS. 8-10 and may or may not utilize or be provided with partitions depending on how well organized the eaches are with respect to the tote or sub-totes within the tote. One such exemplary accumulation table will be described in greater detail with respects to FIGS. 8-10. In alternate aspects, any suitable case stripping module or accumulation module may be provided.

Figure 6:
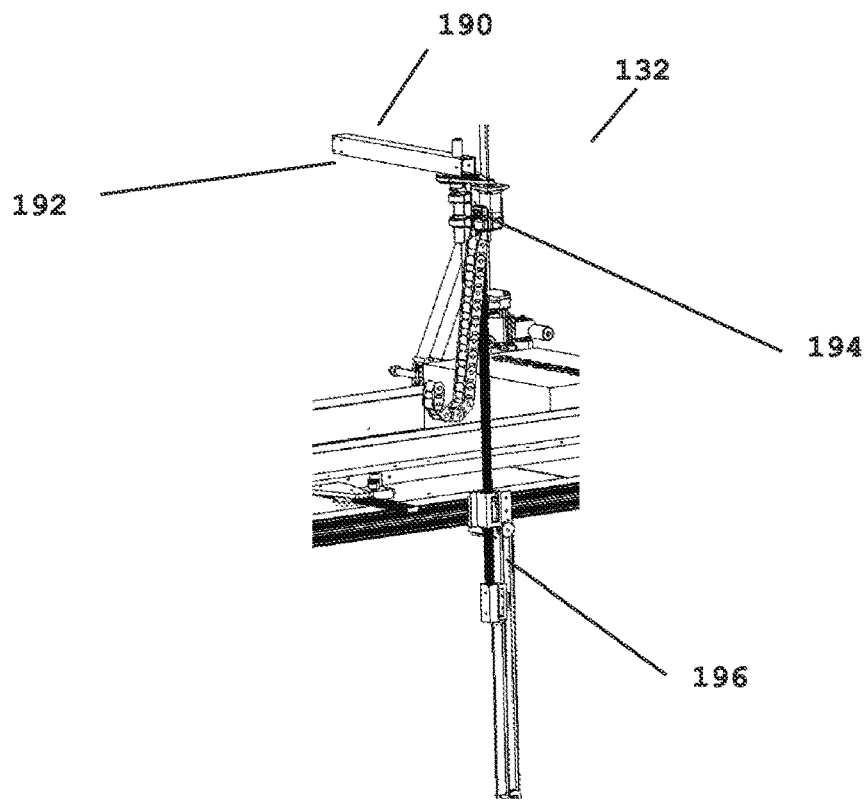
FIG. 6 is an isometric view of a suction arm portion of the edge cutting module according to embodiments of the present technology.

Referring now to FIG. 6, there is shown an isometric view of a suction arm portion 132 of the edge cutting module 24 where suction arm portion 132 is utilized for case packaging removal. Although arm portion 132 is shown downstream of the case cutting portion edge cutting module 26, similarly one or more of arm 132 may be provided downstream of inversion module 28 or edge cutting module 22 for the removal of case packaging as needed. Case packaging removal arm 132 may receive cases with the peripheral edges removed and removes case material exposing the underlying eaches where the case material is removed by a trash conveyor (not shown). Case packaging removal module 132 has a base which utilizes pusher drives 90, 92 to selectively drive case 88 in direction 80. Alternately, arm 132 may utilize a conveyor which may be a roller or belt conveyor where the conveyor may further be a vacuum conveyor to hold the base of case 88 relative to the eaches. Sensors may be provided where sensors may be cameras, optical sensors or any suitable sensor to detect leading and trailing edges of case as well as sides of case as needed. Arm 190 of case material removal module 132 may have vacuum head 192 and be driven by multi axis drive 194, 196 where vacuum head 192 is positionable in one or more of directions/axes with rotary drive 194 and vertical linear drive 196. Here, vacuum head 192 may have multiple bladders with or without plates and is adapted to grip an relocate/position cardboard case lids, case plastic wrap, product or groups of eaches or the base of the case alone or in combination. By way of example, vacuum head 192 may pick or position any of the foregoing from a base or conveyor and place to the trash conveyor. Alternately, vacuum head 192 may pick or position any of the forgoing, for example, the eaches from a conveyor, and place back to the conveyor, for example, after the base of the case is removed. Although drive 132 is shown between module 26 and 28, drive 132 may be otherwise positioned, for example above conveyors or pushers so there is a clear path between conveyors. Although pushers are shown one or more conveyors may be provided, for example, below drive 132 or otherwise. An example non-limiting case material removal sequence: 1) arm 132 downstream of module 26 removes the case top, 2) case top is ejected to trash via conveyor, 3) pushers 90, 92 push case 88 into inversion module 28, 4) inversion module 28 inverts case 88, 5) arm 132 downstream of inversion module 28 removes the case bottom or base, 6) stripped case 88 of eaches only is advanced to module 30 and case bottom or base is ejected to trash via conveyor. In alternate aspects, a blower (not shown) may be provided, for example, to blow the case base onto a conveyor or remove excess packaging. Although representative sequences have been described, any suitable combination of actions by subcomponents of module 26, 132 or otherwise may be provided.

Figure 7:
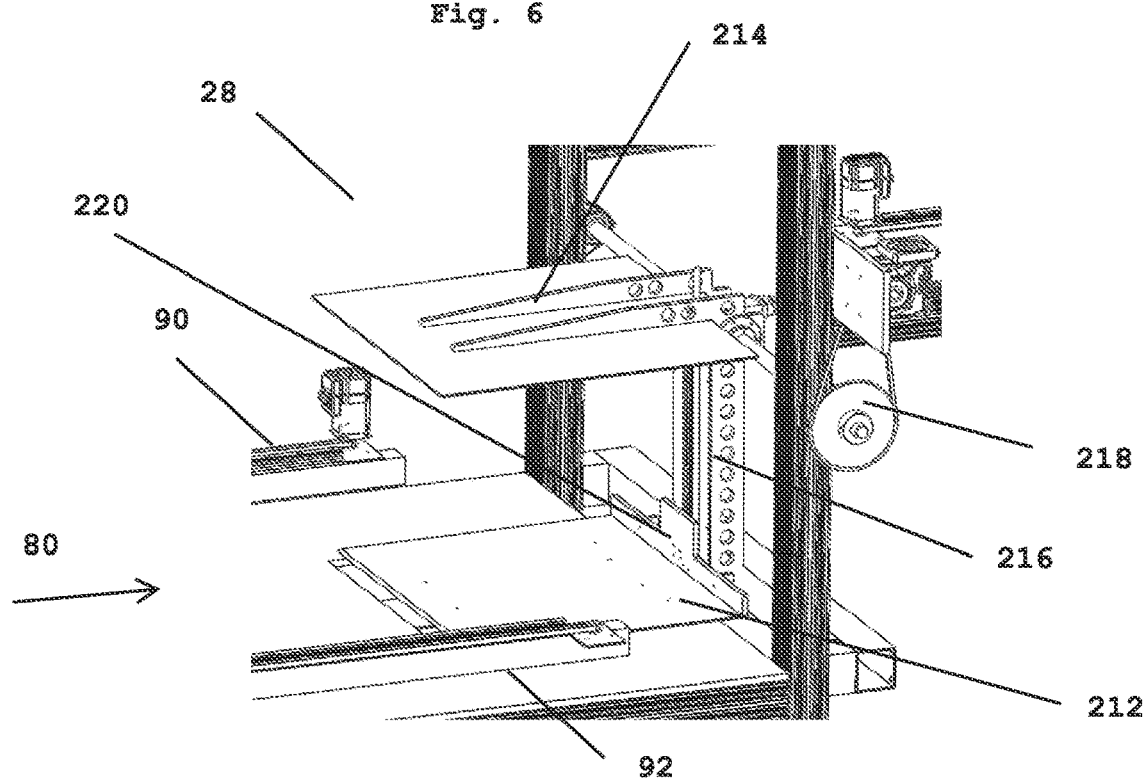
FIG. 7 is an isometric view of a box inverter according to embodiments of the present technology.
Figure 8A:
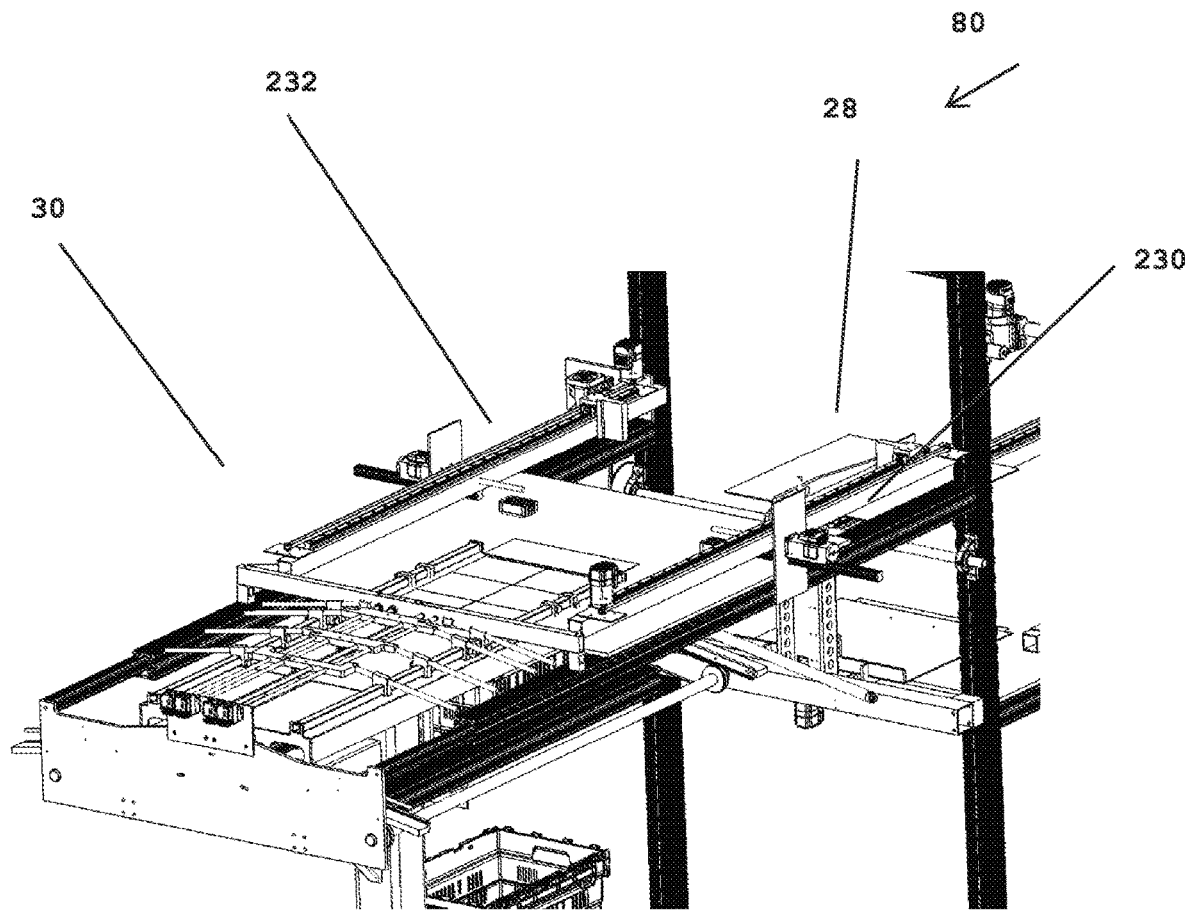
FIGS. 8A-8B are isometric views of an each-separator module according to embodiments of the present technology.
Figure 8B:
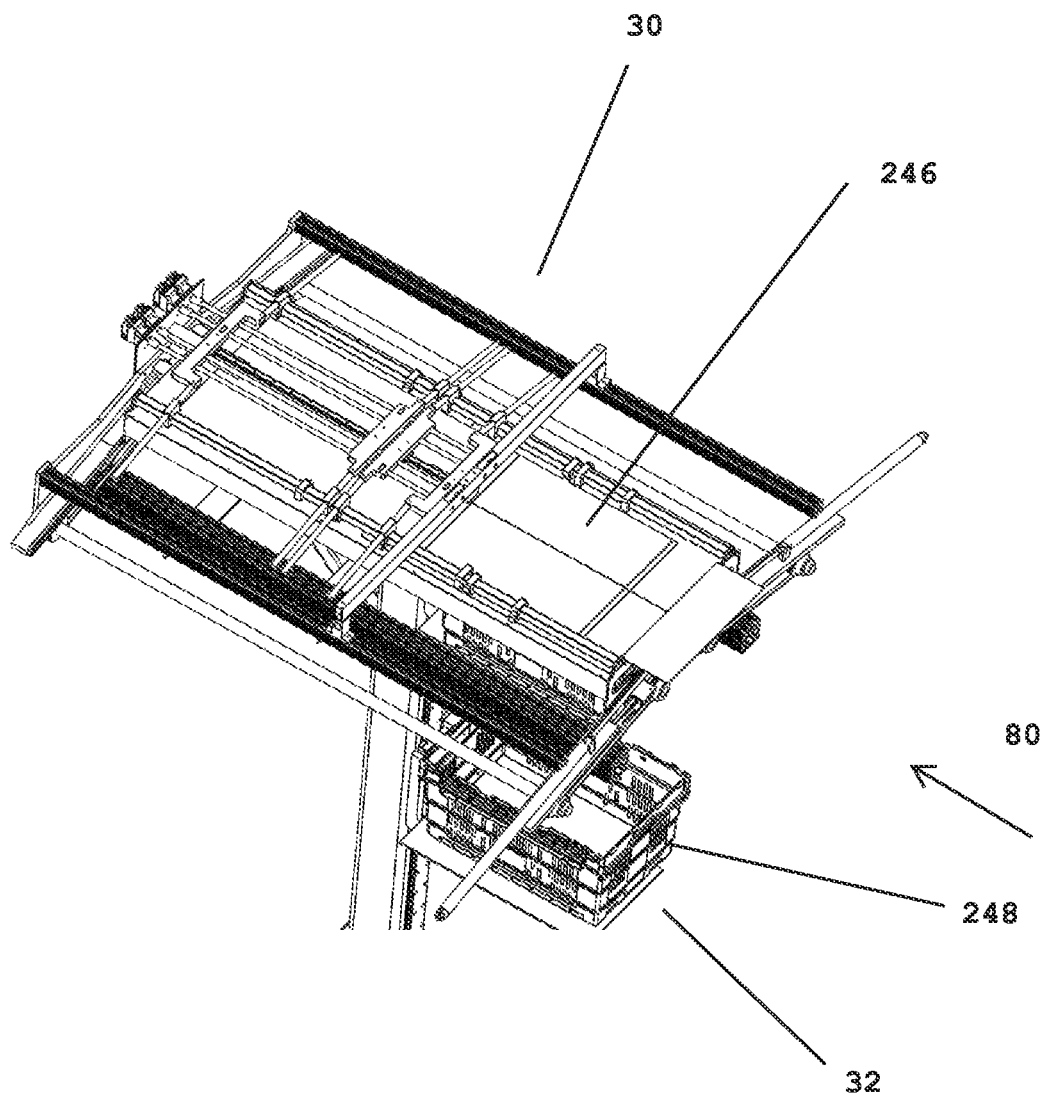

Referring now to FIG. 7, there is shown an isometric view of a box inverter 28. Case 88 with the top of the case material removed by arm 132 is advanced by pusher drives 90, 92 into inverter module 28 for inversion. Although inverter module 28 is shown capable of handling a single case at a time, in alternate aspects a second or additional case handling mechanism(s) may be added, for example, to have a double case handling mechanism "water wheel" design so one case can be loaded (on side 26) while the other is being unloaded (on side 30). Inverter module 28 has lower plate 212 onto which case 88 is pushed. Case 88 is gripped or suitably retained by inverter module 28 where a screw or other suitable drive raises case 88 by raising plate 212 such that the top edge is brought into engagement with upper plate 214. Lower and upper plates 212, 214 may have perpendicular surfaces 220 that are used to support the side of case 88 or exposed eaches as the case may be when case 88 is inverted. Inversion module 28 has rotary drive 218 provided to rotate case 88 180 degrees to present and inverted case 88 to each separation module 30. The inversion module 28 may also be used to create a height advantage for drop catch depending on location of the hinge. Referring also to FIG. 8A, there is shown an isometric view of an each-separator module 30. Referring also to FIG. 8B, there is shown an isometric view of an each-separator module 30. FIGS. 7 and 8A show inversion module 28 in a state prior to inverting case 88. After inverting case 88, pushers 230, 232 are provided where pushers 230, 232 may have features similar to pushers 90, 92 and associated moveable axis. Pushers 230, 232 advance case 88 down stream inversion module 28 toward separation module 30 where an additional arm 132 may be provided to remove case material from the bottom of case 88. With the case material removed, the eaches contained within the now stripped case are driven to the each separation table 30. Here, pushers 230, 232 advance case 88 further down stream where, for example, the width of the pushers 230, 232 is set so that the fence width preserves the arrangement of eaches during the translations; see FIGS. 9A-9D where the pushers 230, 232 and the fence width has been removed for clarity. As seen in FIG. 8B, the each separation table 30 is placed above the drop catch module 32 where eaches are advanced onto each separation surface 246 by pushers 230, 232 where pushers 230, 232 have been removed for clarity. As will be described, each separation surface 246 has flaps or leaves that overlap each other where the flaps or leaves are selectively moved under the eaches: 1) to selectively separate the eaches individually or in groups from each other as illustrated in FIGS. 9A-9G, and 2) to be selectively pulled from or removed from under the separated eaches such that the separated eaches can be controllably dropped and caught by and into tote 248 shown in combination with drop catch module 32.

Figure 9A:
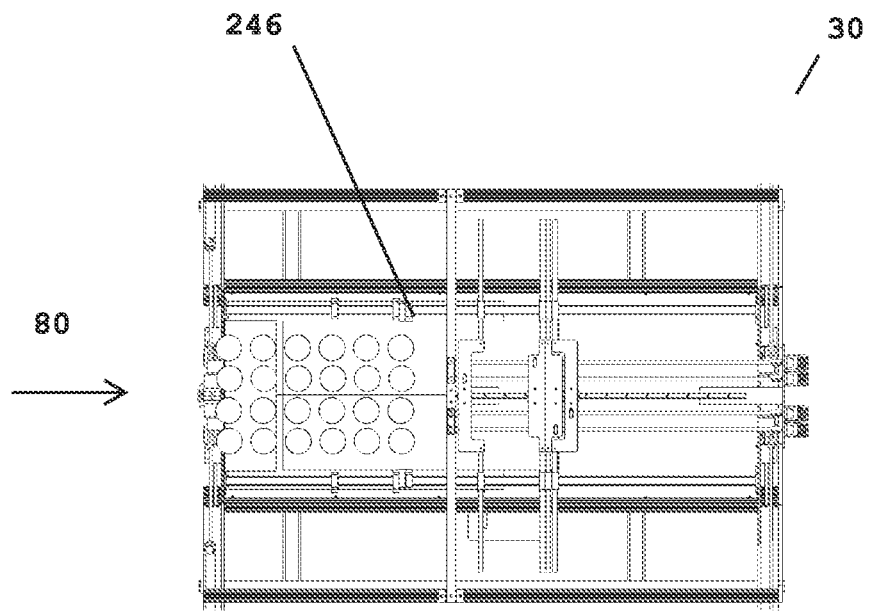
FIGS. 9A-9G are plan views of an each-separator module progressing through an each-separation process according to embodiments of the present technology.
Figure 9B:
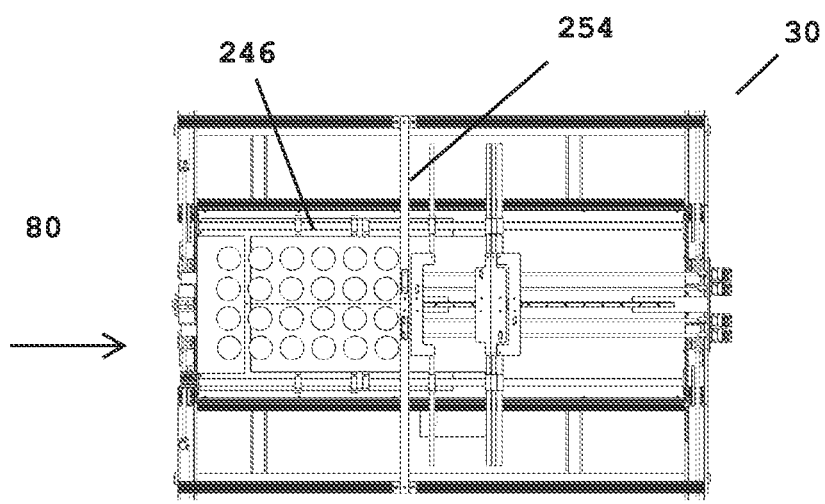
Figure 9C:
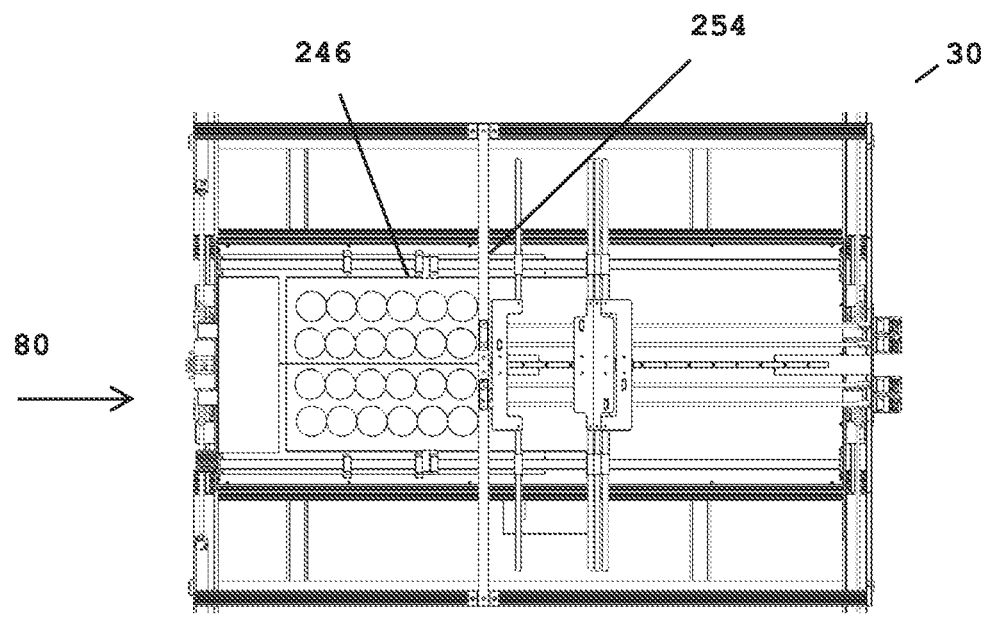
Figure 9D:
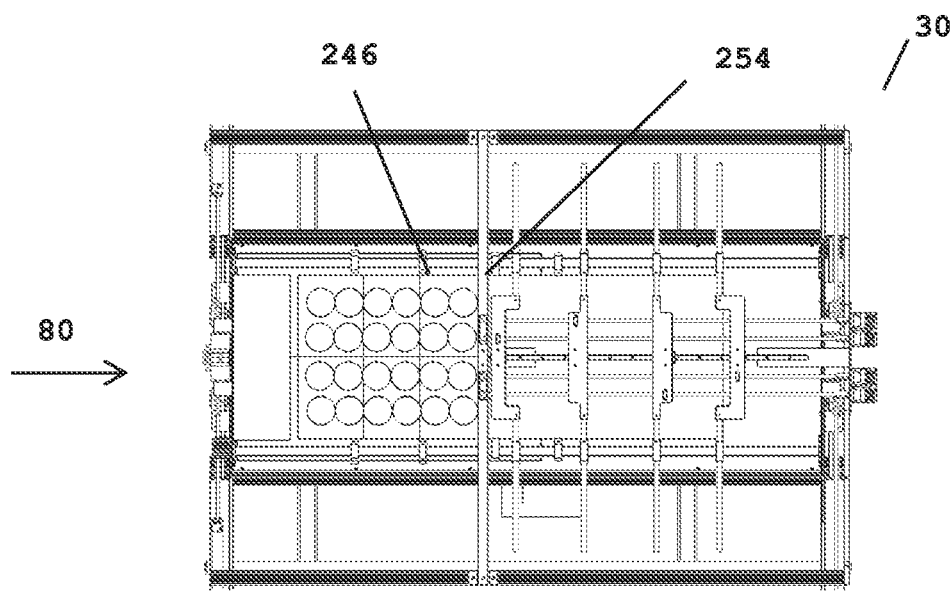
Figure 9E:
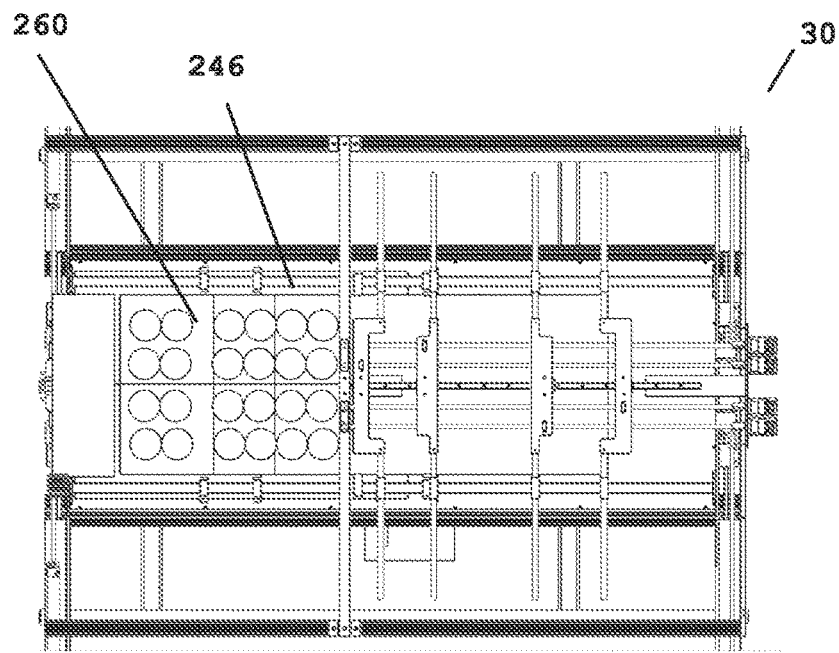
Figure 9F:
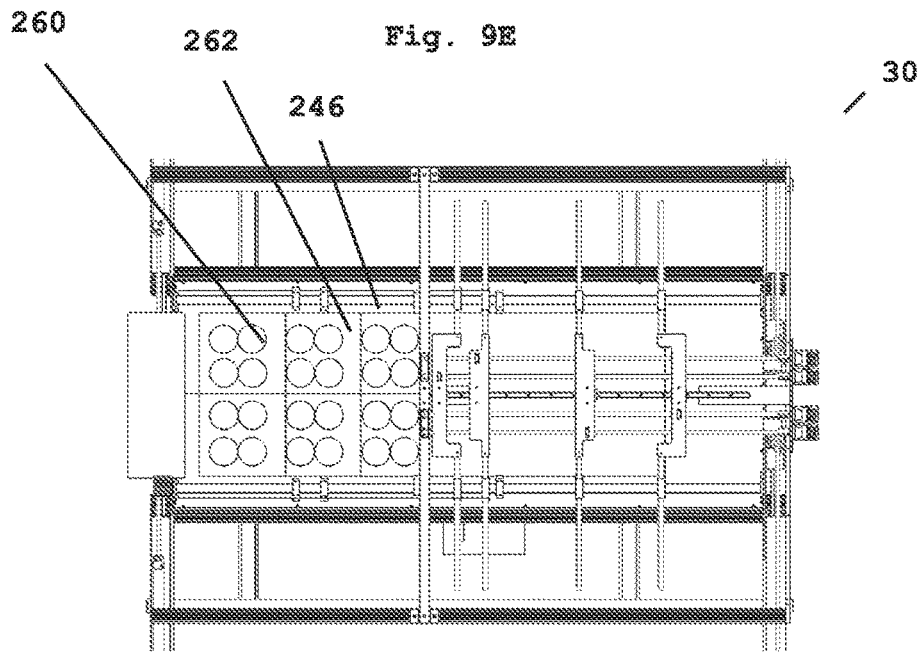
Figure 9G:
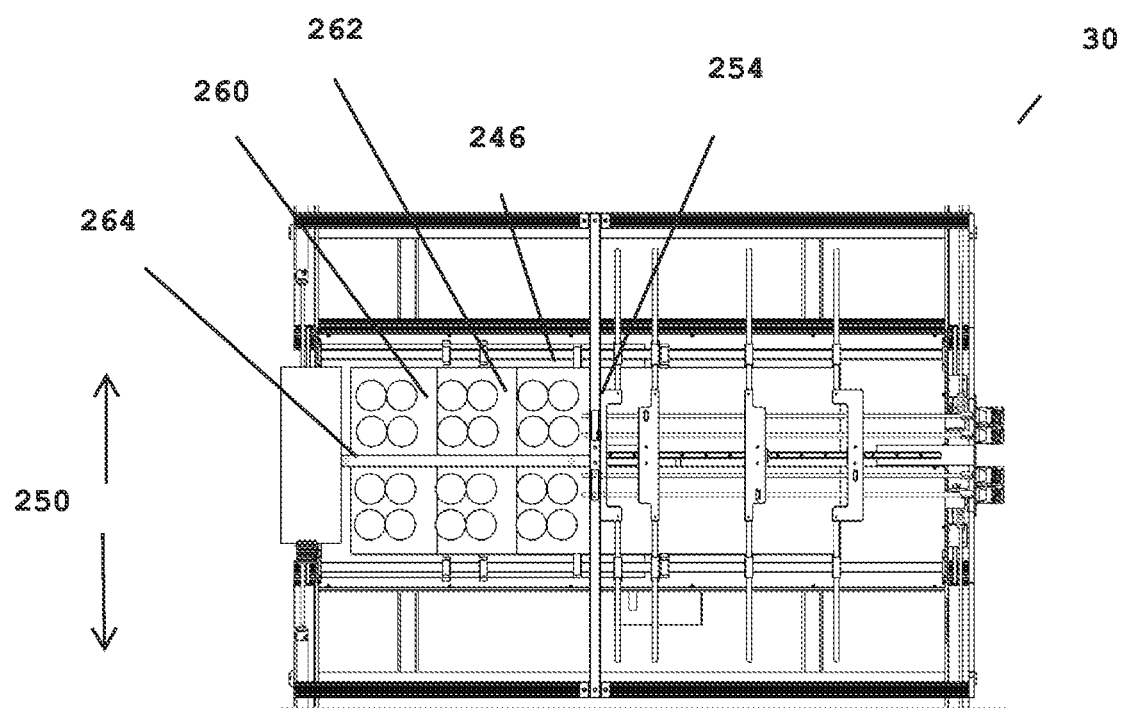

Referring now to FIGS. 9A-9G there is shown a plan view of an each-separator module progressing through an each-separation process. In FIG. 9A, the flaps or leaves 246 overlap each other and eaches come in pushed from the left 80. In FIG. 9B 2—eaches are pushed in direction 80 up against back barrier 254. In FIG. 9C, 3—eaches are pushed or squished up against back barrier 254, for example, so all are touching or nearly touch. In FIG. 9D, leafs 246 separate from the left to the right 80 (they are sitting stacked below the product as seen in FIGS. 9A-9C), and locate themselves under the eaches in a pattern of the long ways 80 separation desired. In FIG. 9E, a first leaf of leafs 246 backs up opposite direction 80 revealing the long ways gap 260 for the first section of goods. In FIG. 9F, a second leaf of leafs 246 also backs up opposite direction 80 revealing the long ways gap 262 for the second section of goods (the first moves along with it to maintain the first gap 260). In FIG. 9G, the two opposing sides of leafs 246 separate width way 250 to create a gap 264 in the middle of the goods resulting in 6 different groups of 2×2 eaches. As will be described, this may be done with the same pull-out mechanism for releasing the eaches to the tote via the drop catch with creates the width way gap. The gap could also be created by a brief depressurization of the air cylinder. Of further note, the eaches may be withdrawn in a direction to opposite to 80 to create a further gap between the eaches and backing bar 254.

Figure 10A:
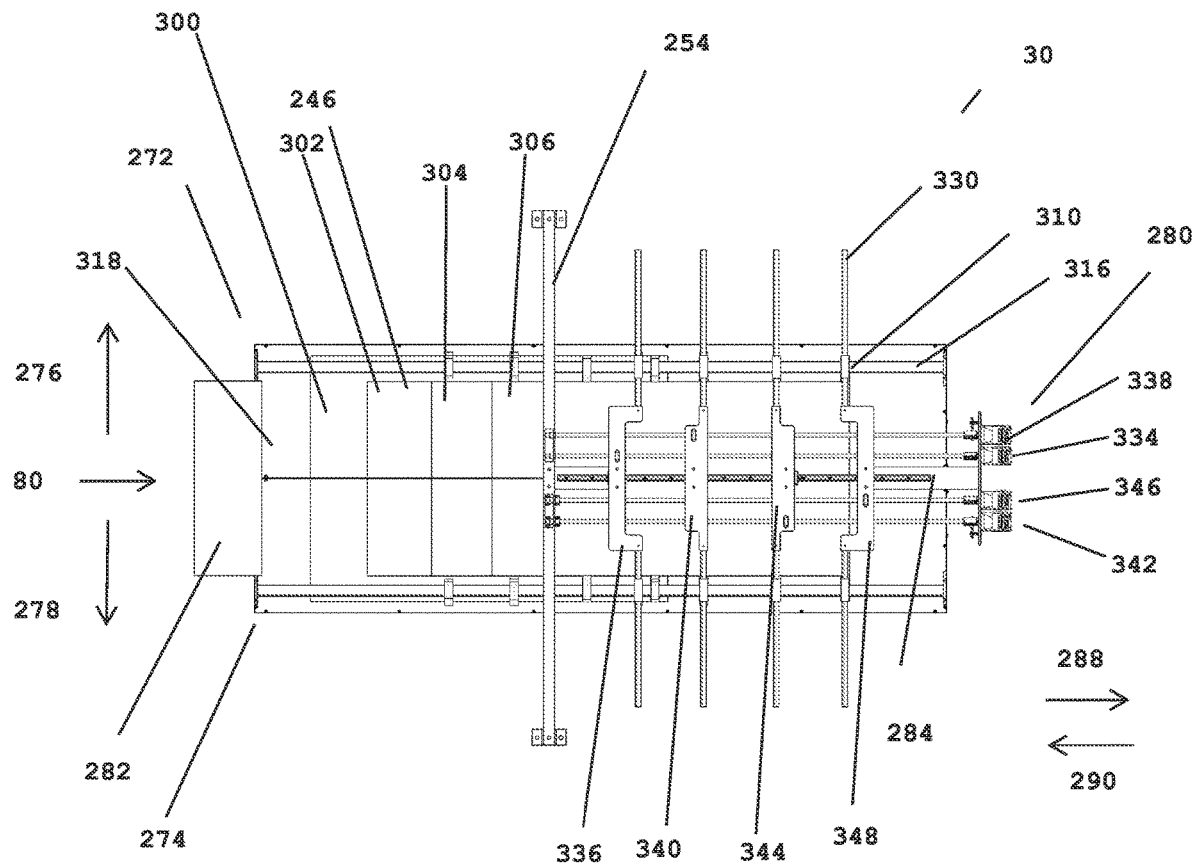
FIG. 10A a plan view of portions of an each-separator module according to embodiments of the present technology.
Figure 10B:
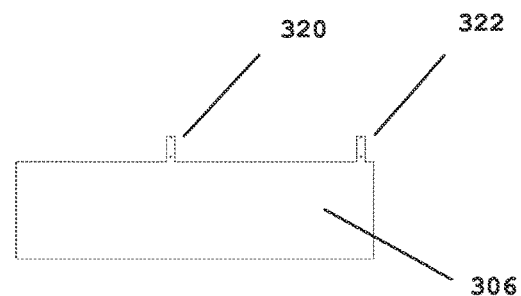
FIG. 10B is a plan view of a leaf or shutter according to embodiments of the present technology.

Referring now to FIG. 10A there is shown a plan view of an each-separator module with certain components removed for clarity. Referring also to FIG. 10B there is shown a plan view of an example leaf or shutter. Leaf assembly 246 is separated into two major components—left leaf assembly 272 and right leaf assembly 274 where left and right leaf assemblies 272, 274 may be separated from each other in directions 276 and 278 respectively as seen in FIG. 9G and as will be described where left and right leaf assemblies 272, 274 may be separated rapidly to drop the eaches into a tote utilizing drop catch module 32.

Module 30 has backing bar 254 and motors 280 and rail 284 and intake surface 282 that remain stationary with respect to left and right leaf assemblies 272, 274 which are movable with respect to each other in directions 276, 278 (including their respective leafs). Further, backing bar 254, motors 280, rail 284 and intake surface 282 remain stationary with respect to individual leafs which are moveable in pairs in directions 288, 290 where 288 corresponds to direction 80 and 290 opposite 80. Left leaf assembly 272 has first leaf 300, second leaf 302, third leaf 304 and fourth leaf 306. Where the leafs are each mounted to a pair of guide blocks 310 (8 shown) that are constrained along directions 288, 290 by guide rod 316 where guide rod 316 is fastened and grounded to base 318 of left leaf assembly 272. Hence the 4 leafs 300, 302, 304, 306 are constrained to move only in directions 288, 290 relative to base 318. Referring to FIG. 10B, leaf 306 is shown having tabs 320, 322 that fasten to their respective guide blocks. Drive motors 280 utilize lead screw drives as will be described to selectively move and locate pairs of leafs in directions 288, 290, each of a given pair located on respective sides on each of left and right leaf assemblies 272, 274. Each motor selectively drives a drive block, each drive block having opposing guide rods 330 that allow blocks 310 to slide on their respective guide rod 330 allowing relative motion between the rod 330 and the block 310 such that when the left and right leaf assemblies 272, 274 are moved in directions 276, 278 the leafs remained in position in directions 288, 290. Here motor 334 is coupled by its respective screw to drive block 336 which in turn is coupled by its respective guide rod and guide block to leaf 300 to independently move leaf 300 in directions 288, 290. Similarly, motor 338 is coupled by its respective screw to drive block 340 which in turn is coupled by its respective guide rod and guide block to leaf 302 to independently move leaf 302 in directions 288, 290. Similarly, motor 342 is coupled by its respective screw to drive block 344 which in turn is coupled by its respective guide rod and guide block to leaf 304 to independently move leaf 304 in directions 288, 290. Similarly, motor 346 is coupled by its respective screw to drive block 348 which in turn is coupled by its respective guide rod 330 and guide block 310 to leaf 306 to independently move leaf 306 in directions 288, 290. Guide 284 may be provided to constrain drive blocks 336, 340, 344, 348 to allow motion in directions 288, 290.

Figure 11A:
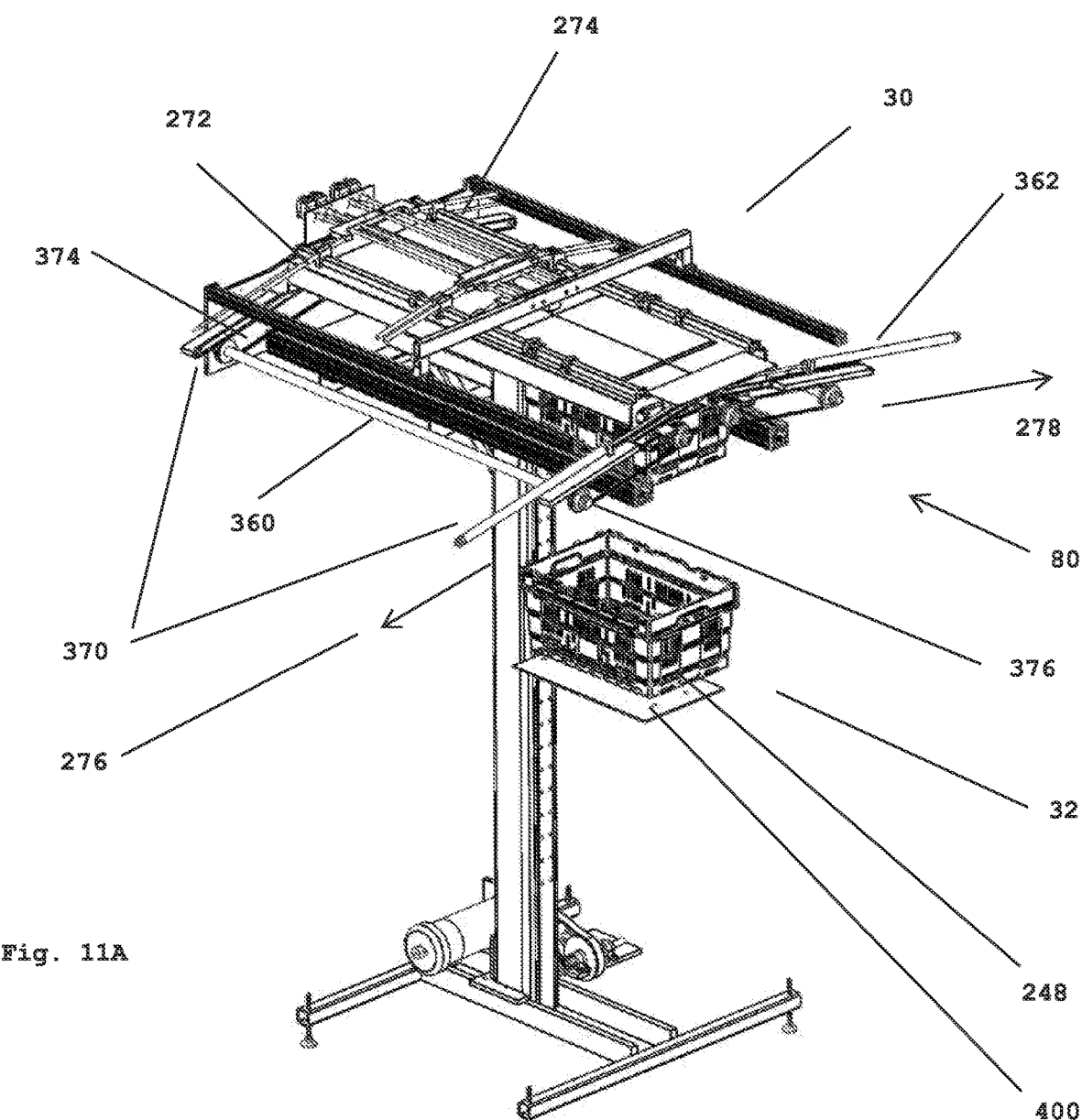
FIGS. 11A-11B are isometric views of an each-separator module according to embodiments of the present technology.
Figure 11B:
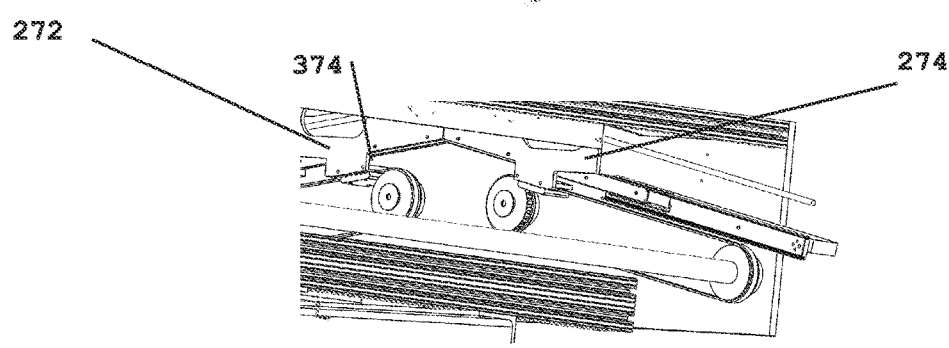

Referring now to FIG. 11A, there is shown an isometric view of an each-separator module 30 integrated with a drop-catch module 32. Referring also to FIG. 11B, there is shown a partial isometric view of an each-separator module 30. Each separator 30 in addition to separating eaches also acts as a load staging table where actuators controllably separate left and right leaf assemblies 272, 274 moved in directions 276, 278 very quickly allowing the eaches to be dropped into tote 248. Directions 276, 278 are not parallel to each other; instead of being 180 degrees apart, they are at slightly less than 180 degrees such that when the left and right leaf assemblies 272, 274 moved in directions 276, 278 quickly, the accelerating (falling or dropping) eaches do not contact the leaves as they are being withdrawn. Each of separate left and right leaf assemblies 272, 274 have actuators 360, 362 respectively to move them respectively in directions 276, 278. Here, the vertical vector component of sliding plates or leaves being withdrawn to drop the eaches without contact exceeds 1 g for this purpose. The sliding plates may have a low friction surface to ensure no sticking. Actuator 360 has two cylinders (one shown) 370, the cylinder of which is grounded and the rod of which is coupled to left leaf assembly 272. A pair of timing pulleys and belts 374, 376 has the pulleys grounded and the belts each also coupled to left leaf assembly 272 on opposing ends. A shaft couples two opposing pulleys to prevent misalignment and to positionally align the two cylinders as they move. Directly under the each separation module 30 is the tote to be loaded 248, supported by a Tote Handler 400 and precisely aligned with the load of eaches, i.e. subtotes may be positioned precisely below the subtote groupings of eaches. Tote handler 400 may be any suitable vertical indexer where position and velocity can be suitably controlled. Tote handler 400 may also positively grasp the tote 248 in the event it needs to exceed >1 g or otherwise. Once the load of eaches is organized properly, the left and right leaf assemblies 272, 274 are quickly separated where the supporting surface of the table abruptly disappears very rapidly (ex: faster than 1 g), while also retracting completely into an adjacent housing. Here, left and right leaf assemblies 272, 274 may be split as shown. Further left and right leaf assemblies 272, 274 may be simply laterally moved very quickly, moved rapidly at a downward angle, or alternately be lowered and then or simultaneously be laterally moved out of the way. Alternately left and right leaf assemblies 272, 274 may be hinged horizontally or vertically or otherwise moved out of the way of the dropping eaches. Alternately left and right leaf assemblies 272, 274 may be perforated to prevent suction from the rapid separation from the eaches. Left and right leaf assemblies 272, 274 may be moved by actuators including pneumatic, electric or any suitable actuation. With nothing but air underneath them, the eaches previously supported by the left and right leaf assemblies 272, 274 may now begin to drop at a rate of 1 g. As soon as the falling eaches have cleared the plane of the left and right leaf assemblies 272, 274, the support surface of that table returns to a load position, and the next load of eaches begins to be organized immediately. Because walls of the subtotes are aligned precisely with the Divider/Manipulators, the falling eaches can only drop straight into the subtotes. As the bottom surfaces of the eaches approach the bottoms of the subtotes, the tote-handler 400 begins dropping the tote, almost-but-not-quite matching the velocity of the dropping eaches. Because there is only a slight difference in speed between the tote and the eaches, the force of impact is only very slight when the bottoms of the eaches encounter the bottoms of the subtotes. At that point, the tote decelerates to a gentle stop as seen in Figure. The result of this sequence is that the tote "catches" the falling eaches very softly, with minimal jostling and collision of the eaches.

Figure 12A:
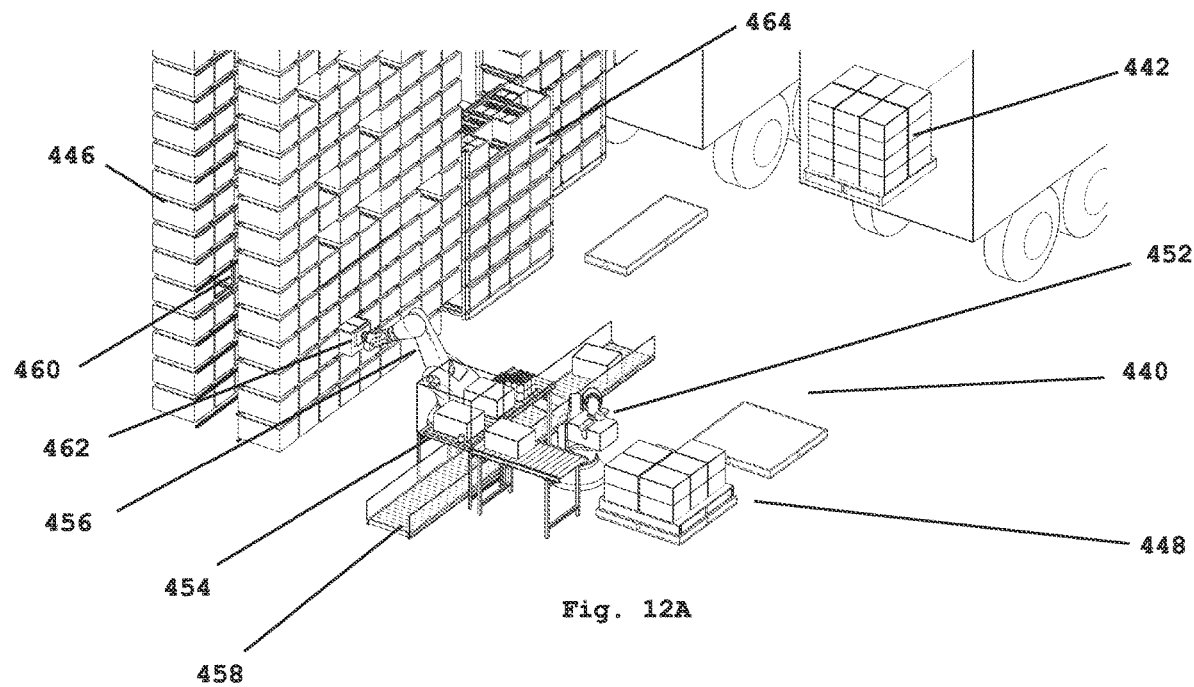
FIGS. 12A-12B are isometric views of an automated decant workstation with drawers according to embodiments of the present technology.
Figure 12B:
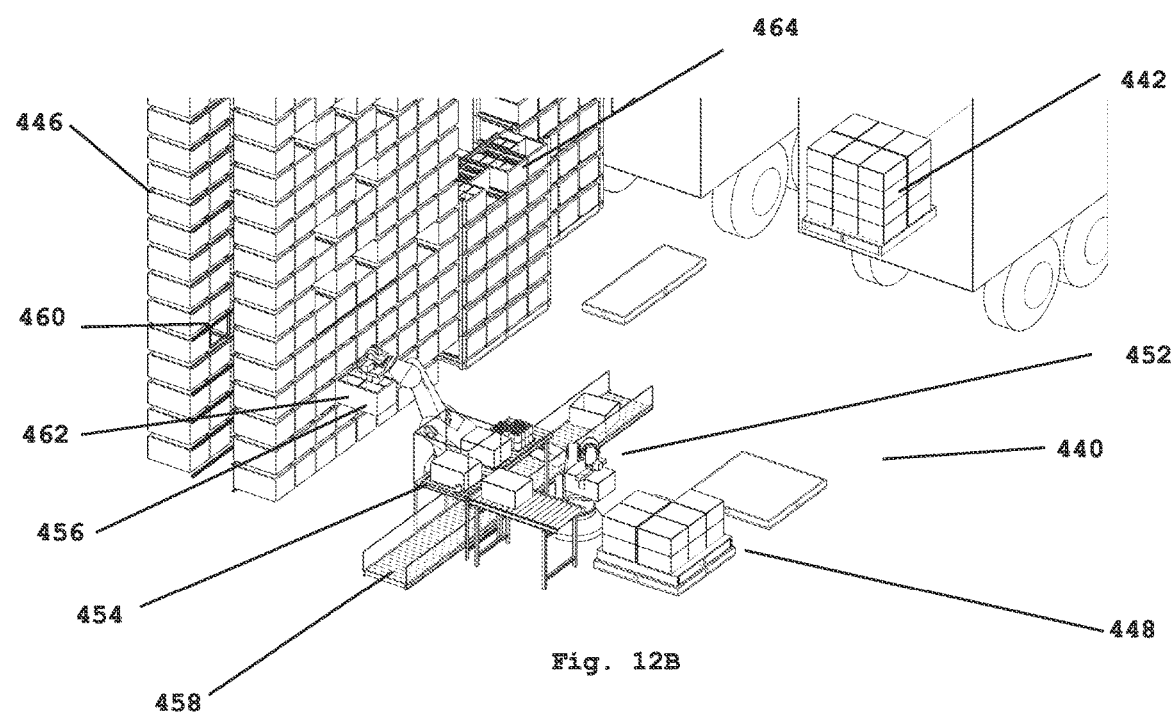

Referring now to FIG. 12A, there is shown an isometric view of an automated decant workstation 440 with drawers being accessed. Referring also to FIG. 12B, there is shown an isometric view of automated decant workstation 440 with drawers having a tote being filled with eaches. Truck or other suitable method bring pallets of cases 442 where workstation 440 is used to strip the cases and decant the eaches into totes within ASRS 446. AGV 448 or other suitable method may be used to bring pallets of cases in proximity to workstation 440 for processing. Workstation 440 has case handling robot 452, case stripper module 454, each handling robot 456 and trash conveyor 458. Case handling robot 452 picks cases from pallets presented for decant and places the cases on the inlet side of case stripper module 454. Case stripper module may have features as disclosed with respect to system 10 (less the drop-catch feature for example) or any suitable case stripping module adapted to remove case packaging to expose the eaches to each handling robot 456. Case packaging material may be transported from workstation 440 utilizing trash conveyor 458 where the case stripping module or either of the robots may be configured to deposit the material on the conveyor. Each handling robot 456 may have dedicated or other tooling to open drawers 462 on a face of drawers of ASRS 446. Each handling robot 456 may have dedicated or other tooling (ex: via tool changer) to handle an array of eaches where each handling robot 456 picks eaches (single or groups) from case stripper module 454, places them in the tote contained with in the drawer and then closes the drawer 462. Tot handling robot 460 within ASRS 446 may then remove the filled tote and replace it with another empty or partially empty tote in the same or suitable drawer for further decant. Further, order totes or product totes—single or mixed sku may be placed in transportable racks 464 for transport by truck or otherwise to another facility or location. In alternate aspects other modifications may be provided. For example, instead of drawers 462 that hold totes which are transported by Bots 460, a shelf may be provided where robot 456 may be configured to pull a tote onto the shelf instead of pulling a drawer out with a tote to expose the eaches and top of the tote. Alternately, the system may be configured where instead of drawers, robot 456 may be configured to pull a tote and place it on a separate shelf for access to the opening on the top for placement of eaches. Here for example, full totes may be loaded in/out of the system with a 6 axis robot 456.

Figure 13A:
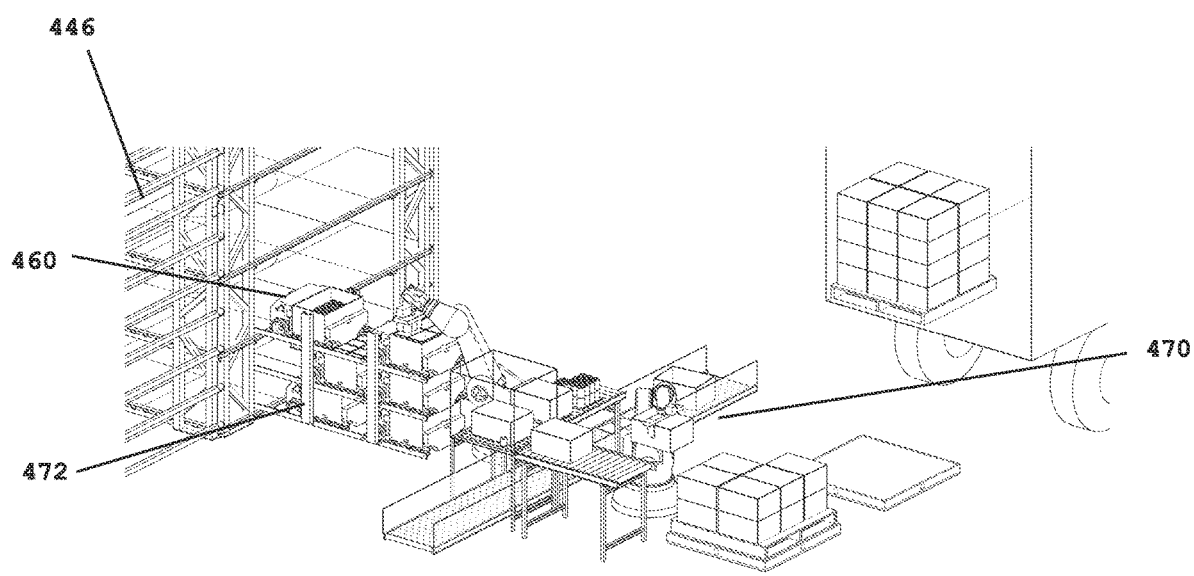
FIG. 13A-13C are an isometric view, side view and plan view, respectively, of an automated decant workstation with a dynamic workstation according to embodiments of the present technology.
Figure 13B:
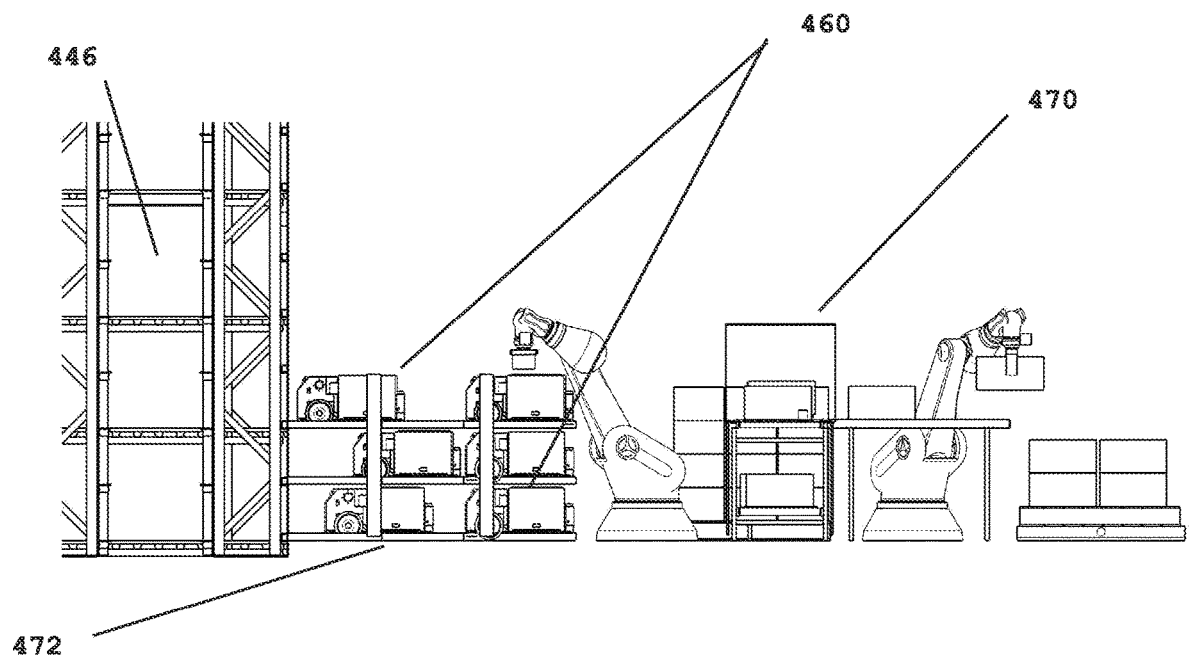
Figure 13C:
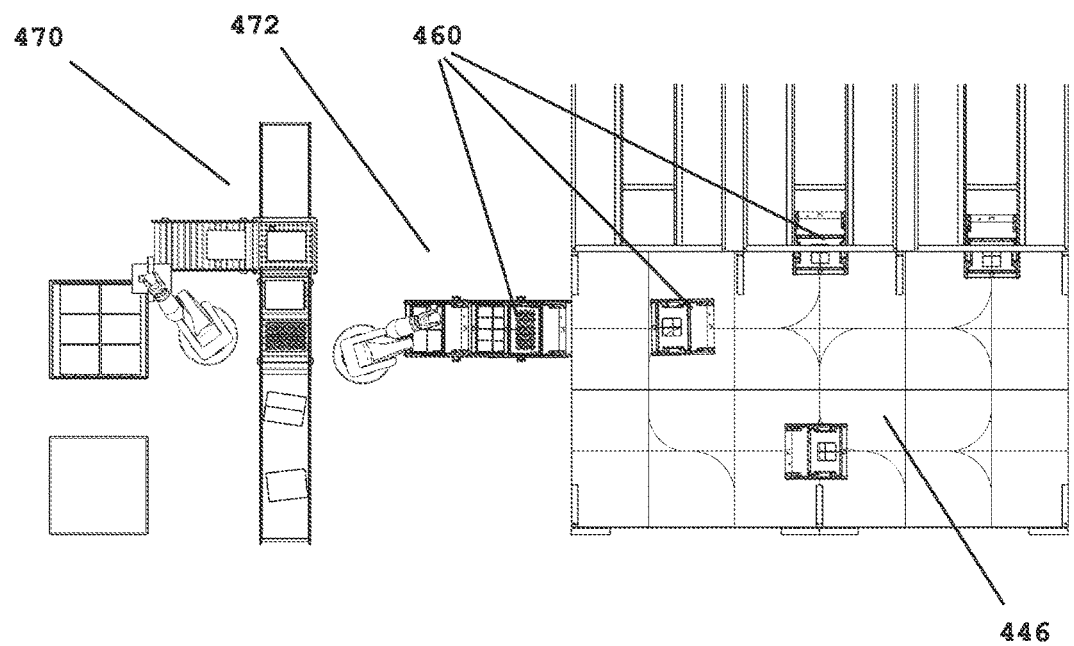

Referring now to FIG. 13A, there is shown an isometric view of an automated decant workstation with a dynamic works station. Referring also to FIGS. 13B and 13C, there are shown side and plan views of automated decant workstation with a dynamic workstation. Truck or other suitable method bring pallets of cases 442 where workstation 470 is used to strip the cases and decant the eaches into totes within ASRS 446'. AGV 448 or other suitable method may be used to bring pallets of cases in proximity to workstation 440 for processing. Workstation 470 has case handling robot 452, case stripper module 454, each handling robot 456 and trash conveyor 458. Case handling robot 452 picks cases from pallets presented for decant and places the cases on the inlet side of case stripper module 454. Case stripper module may have features as disclosed with respect to system 10 (less the drop-catch feature for example) or any suitable case stripping module adapted to remove case packaging to expose the eaches to each handling robot 456. Case packaging material may be transported from workstation 470 utilizing trash conveyor 458 where the case stripping module or either of the robots may be configured to deposit the material on the conveyor. Each handling robot 456 may have dedicated or other tooling (ex: via tool changer) to handle an array of eaches where each handling robot 456 picks eaches (single or groups) from case stripper module 454, places them in the tote contained with in the Bot 460 located in workstation 472. Here, workstation 472 has Bots 460 with empty totes enter workstation 472 at a lower level and allows the Bots to successively cycle up until the Bot and corresponding tote are into position to present its tote to each handling robot 456 for further decant. After each handling robot 456 loads the appropriate eaches into the tote, tote handling robot 460 within ASRS 446' may then remove the filled tote and another Bot 460 circulate into position to present its tote to each handling robot 456 for further decant. Here, with workstation 472, the bot 460 presents the totes in a dynamic fashion as in a dynamic workstation. Although a single wide workstation is shown exposing 1 Bot at a time to robot 456, multiple decant stations may be provided at the same or different decant location where the station may be 2 or more bots wide allowing parallel operation. Further, the workstation when configured with 2 Bots and totes next to each other then workstation 472 may be used in different modes i.e. picking or defrag into decant on off hours or otherwise. Further the control system may be configured to direct Bots with appropriate sub-tote configurations to workstation 472 to match incoming case configurations.

Figure 14A:
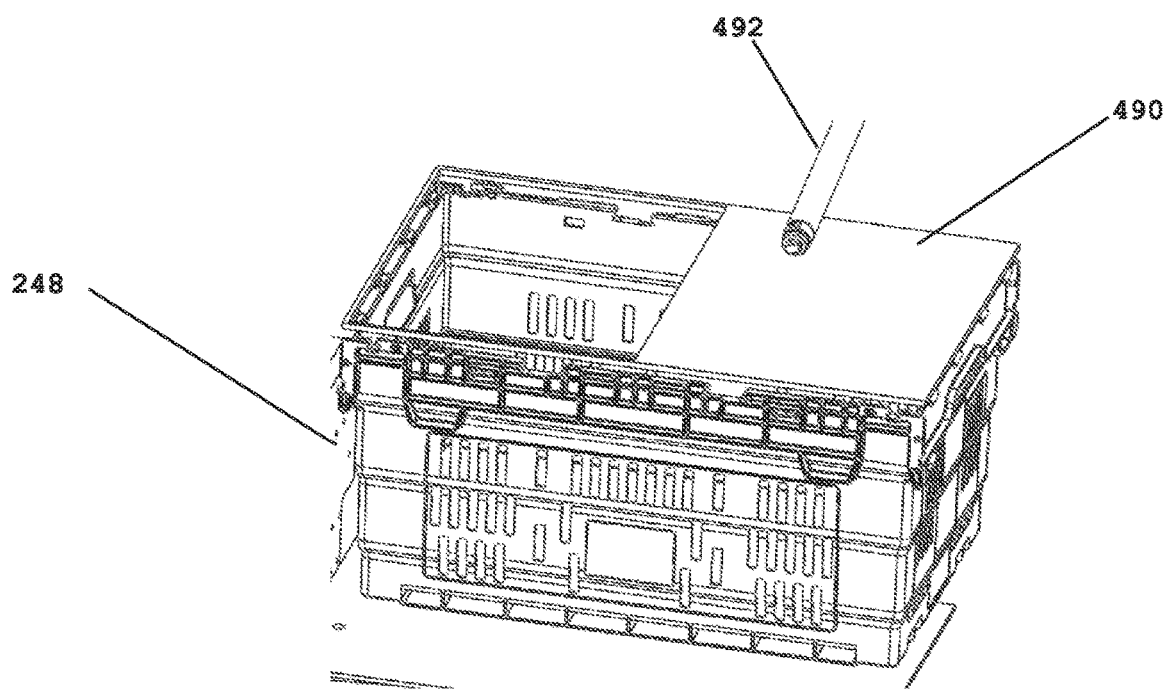
FIGS. 14A-14B are isometric views of a tote covered with shutters according to embodiments of the present technology.
Figure 14B:
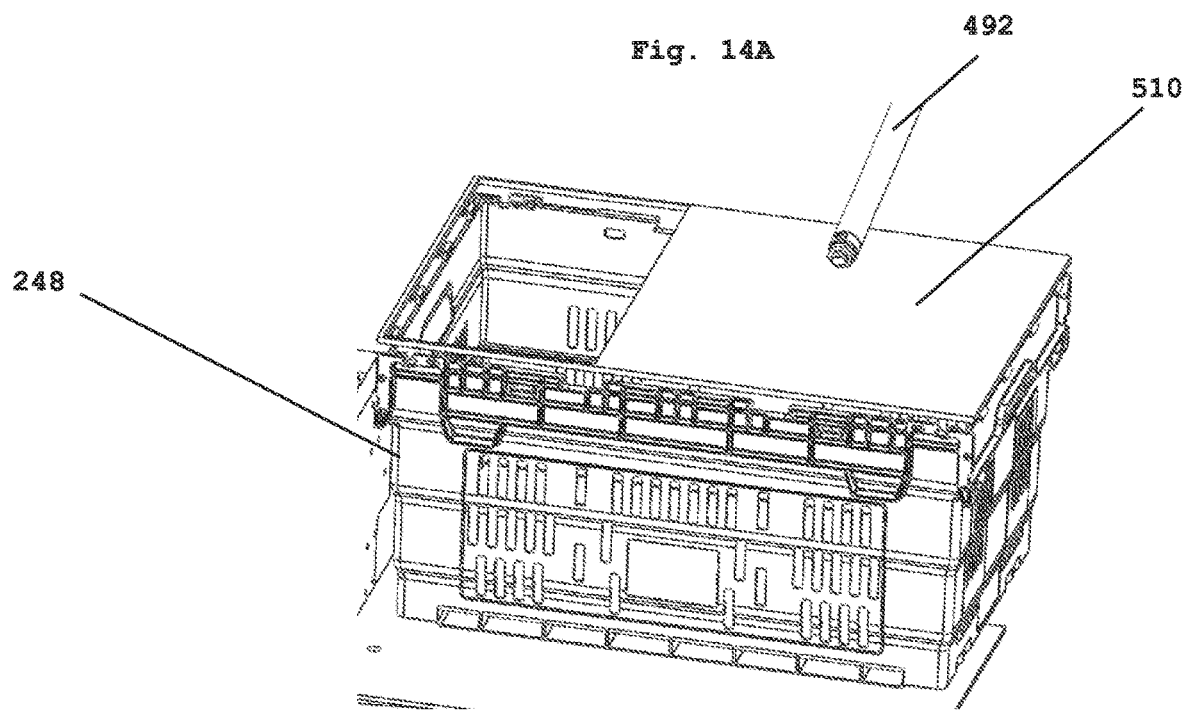

Referring now to FIG. 14A, there is shown an isometric view of a tote 248 covered with a half shutter 490. Shutters may be used as will be described to cover a portion of tote 248. By way of example, tote 248 may have 2 subtotes contained within tote 248 and a shutter 490 may be used to cover up one of the subtotes to prevent eaches from incorrectly being placed the covered subtote. With the shutter, it is not possible to place in the incorrect subtote such that a very simple arm 492 may be used to place eaches into the desired subtote that is exposed by the uncovered opening. Referring now to FIG. 14B, there is shown an isometric view of a tote 248 covered with a third shutter 510. By way of example, tote 248 may have 3 subtotes contained within tote 248 and a shutter 510 may be used to cover up two of the subtotes to prevent eaches from incorrectly being placed the covered subtote. With the shutter, it is not possible to place in the incorrect subtotes such that a very simple arm 492 may be used to place eaches into the desired subtote that is exposed by the uncovered opening. In alternate aspects, shutters, leafs or otherwise may be configured to selectively position eaches or expose openings for any suitable subtote configuration. For example, ½, ⅓, ¾, ⅙, ⅕, ⅛ or any suitable combination of subtotes within totes.

Figure 15A:
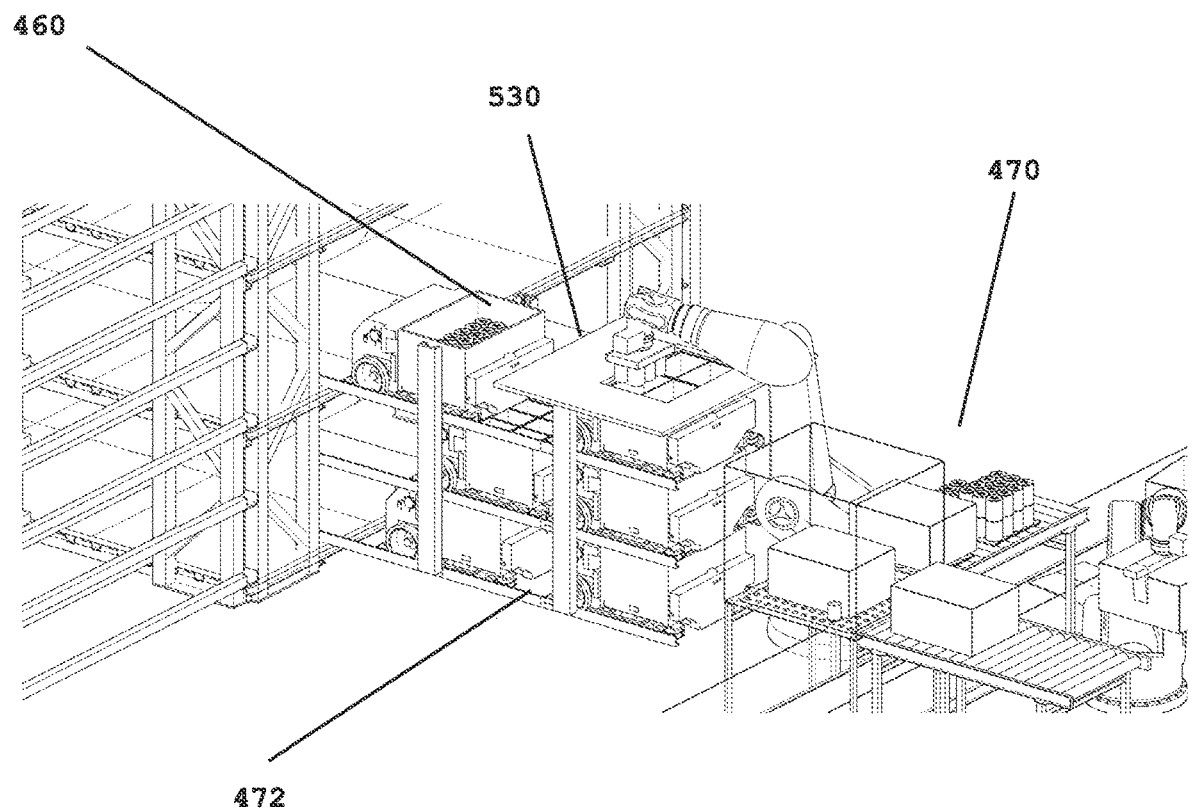
FIGS. 15A-15C are an isometric view, plan view and side view, respectively, of an automated decant workstation with a dynamic workstation having a table according to embodiments of the present technology.
Figure 15B:
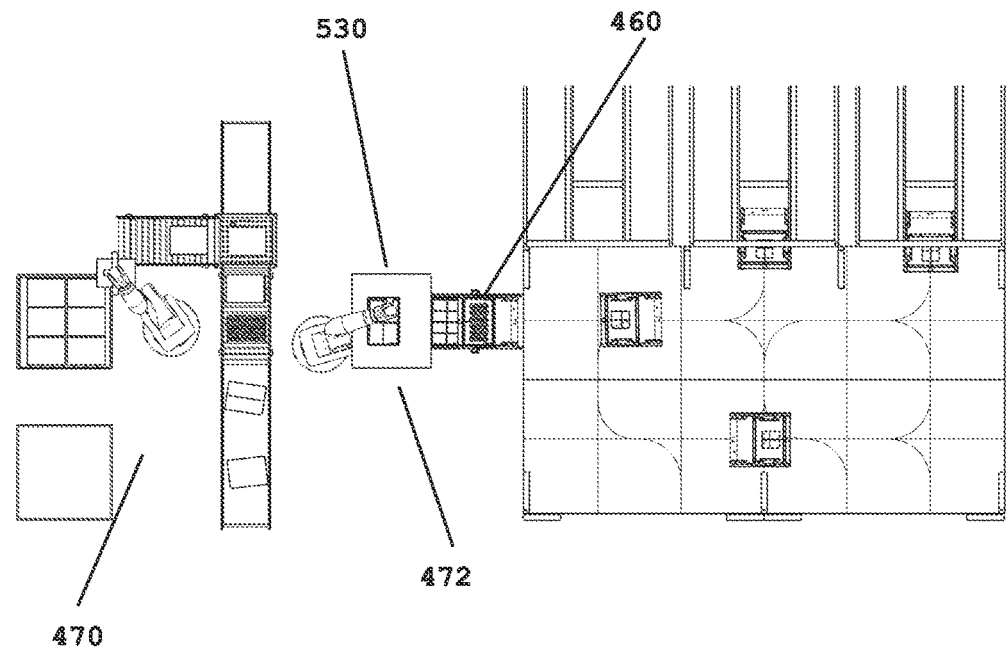
Figure 15C:
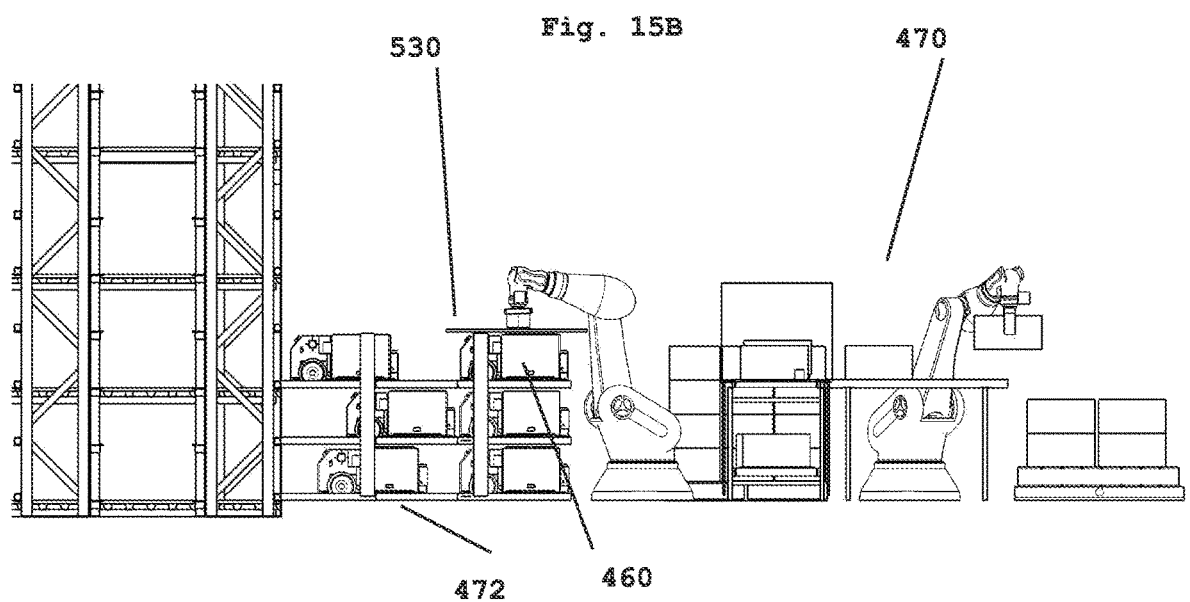

Referring now to FIG. 15A, there is shown an isometric view of an automated decant workstation with a dynamic work station having a table. Referring also to FIGS. 15B and 15C, there are shown plan and side views of automated decant workstation with a dynamic workstation having a table. The system shown may have features as disclosed with respect to FIGS. 13A-13C with the addition of a table 530. Table 530 may surround the top of the tote and ensures eaches can't drop around tote. Here, table 530 has an opening corresponding in size to the opening of the top of the tote. Providing table 530 helps to prevent placement of eaches outside of the opening and if incorrectly placed on the table 530, the robot utilizing machine vision or otherwise can simply push the each back into the tote or appropriate subtote by urging the each appropriately.

Figure 16A:
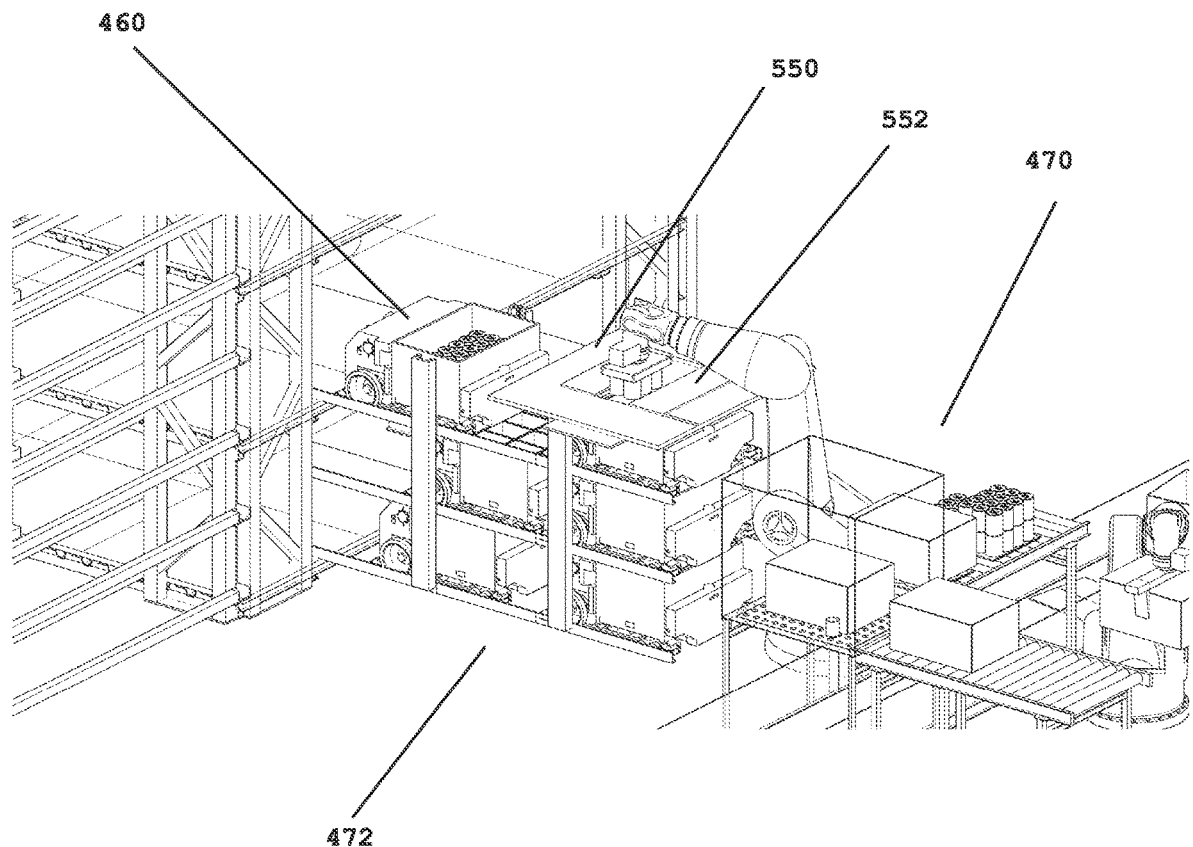
FIG. 16A—16C are an isometric view, plan view and side view, respectively, of an automated decant workstation with a dynamic workstation having shutters according to embodiments of the present technology.
Figure 16B:
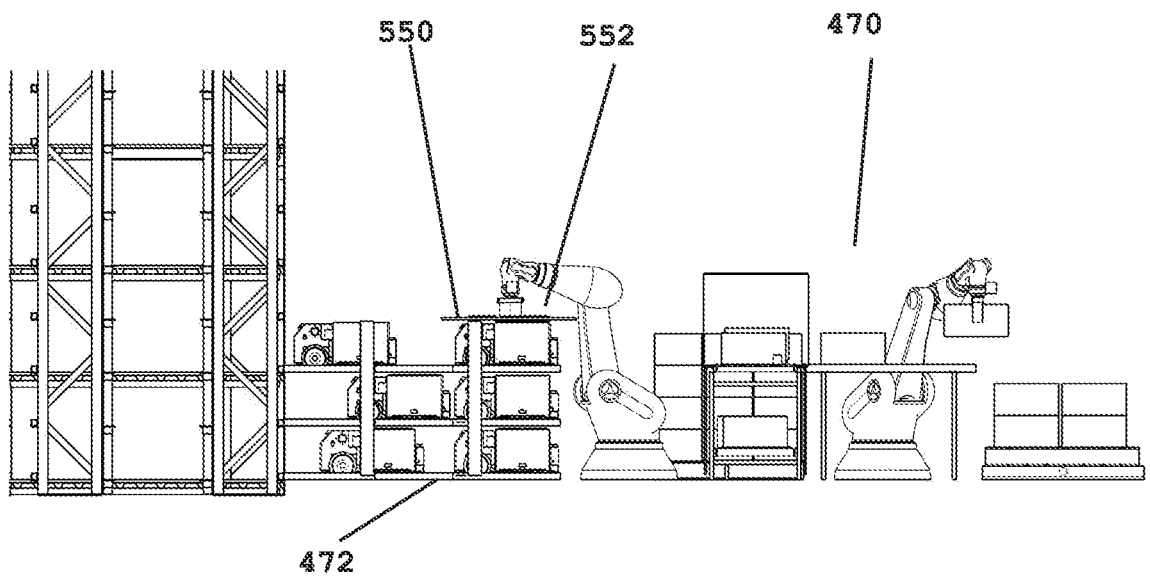
Figure 16C:
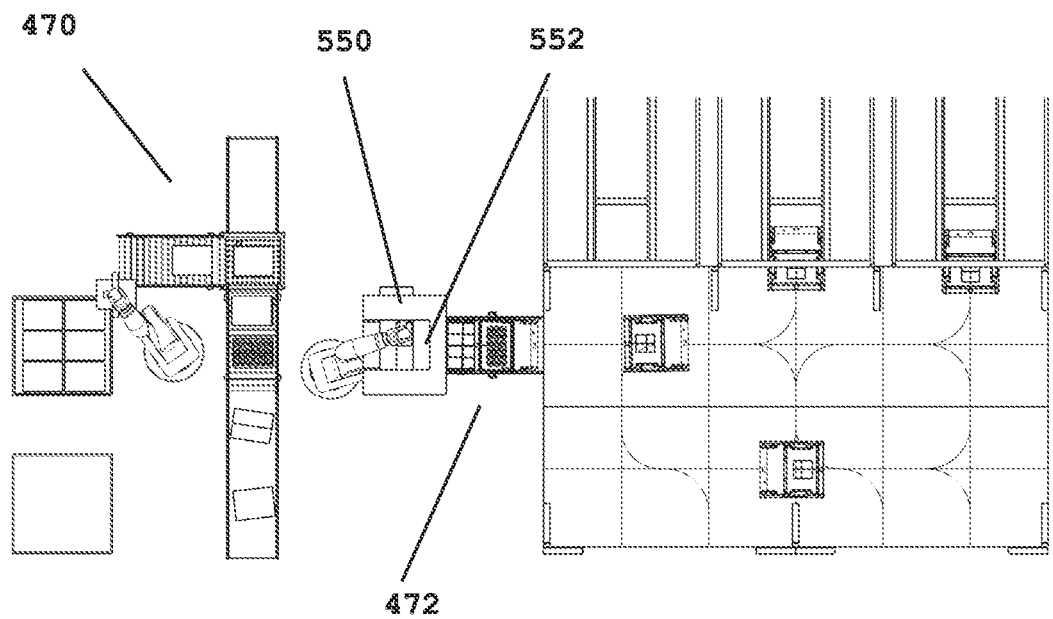

Referring now to FIG. 16A, there is shown an isometric view of an automated decant workstation with a dynamic works station having shutters. Referring also to FIGS. 16B and 16C, there are shown side and plan views of automated decant workstation with a dynamic workstation having shutters. The system shown may have features as disclosed with respect to FIGS. 13A-13C with the addition of a table 550. Here, table 550 has an opening corresponding in size to the opening of the top of the tote. Further, table 550 may have shutters 552 that cover one or more subtote openings in the tote below to prevent placement in the improper subtote. The shutter(s) may be fixed or moveable, for example, as described with respect to the leafs of system 10 but where n shutters would be independently movable to selectively expose any one or more of n subtotes by way of non-limiting example. Providing table 550 helps to prevent placement of eaches outside of the opening that has been selectively exposed and if incorrectly placed on the table 550, the robot utilizing machine vision or otherwise can simply push the each back into the tote or appropriate subtote by urging the each appropriately.

Figure 17A:
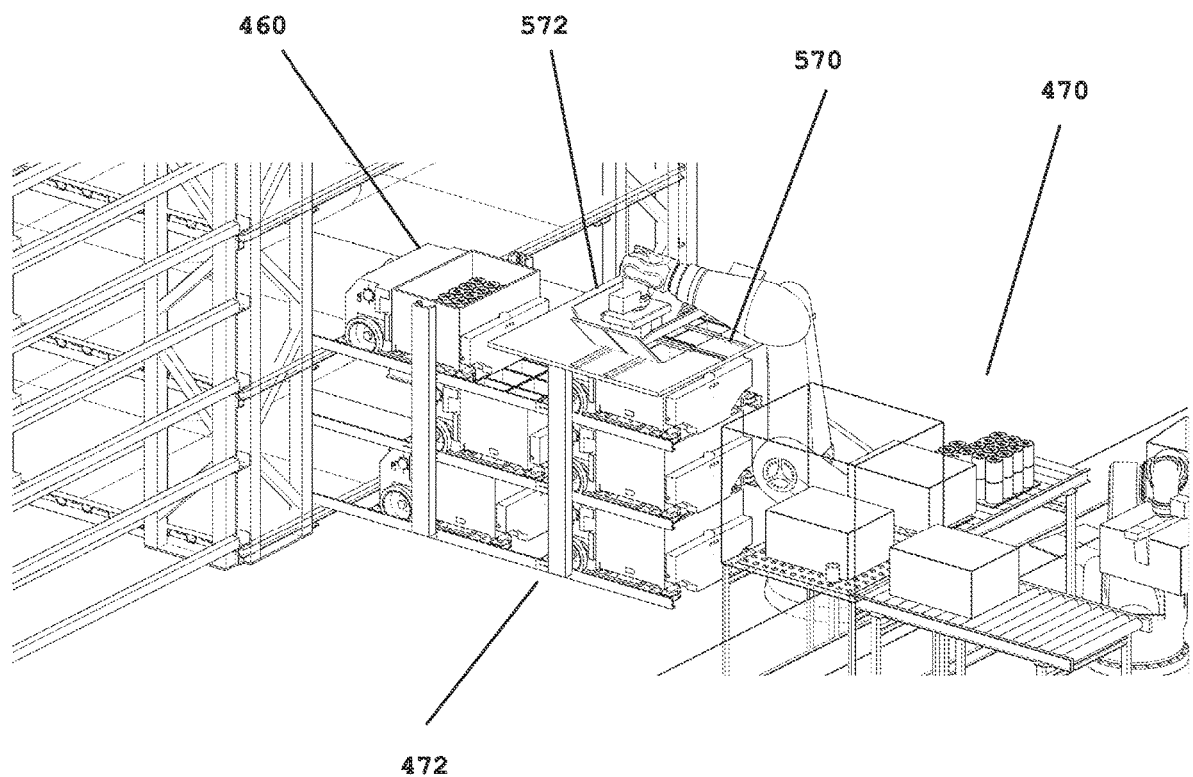
FIGS. 17A-17C are an isometric view, plan view and side view, respectively, of an automated decant workstation with a dynamic works station having funnels according to embodiments of the present technology.
Figure 17B:
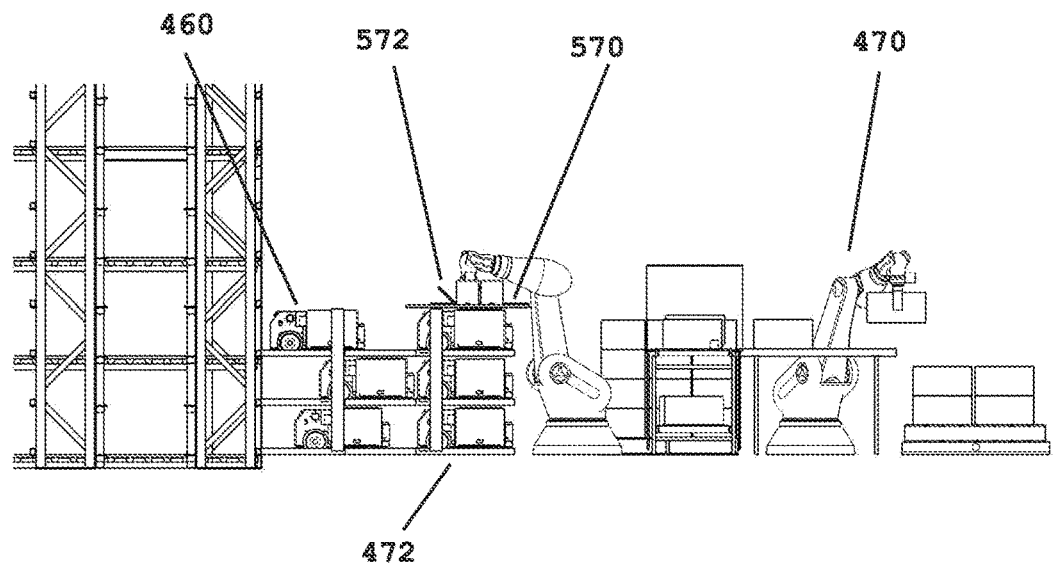
Figure 17C:
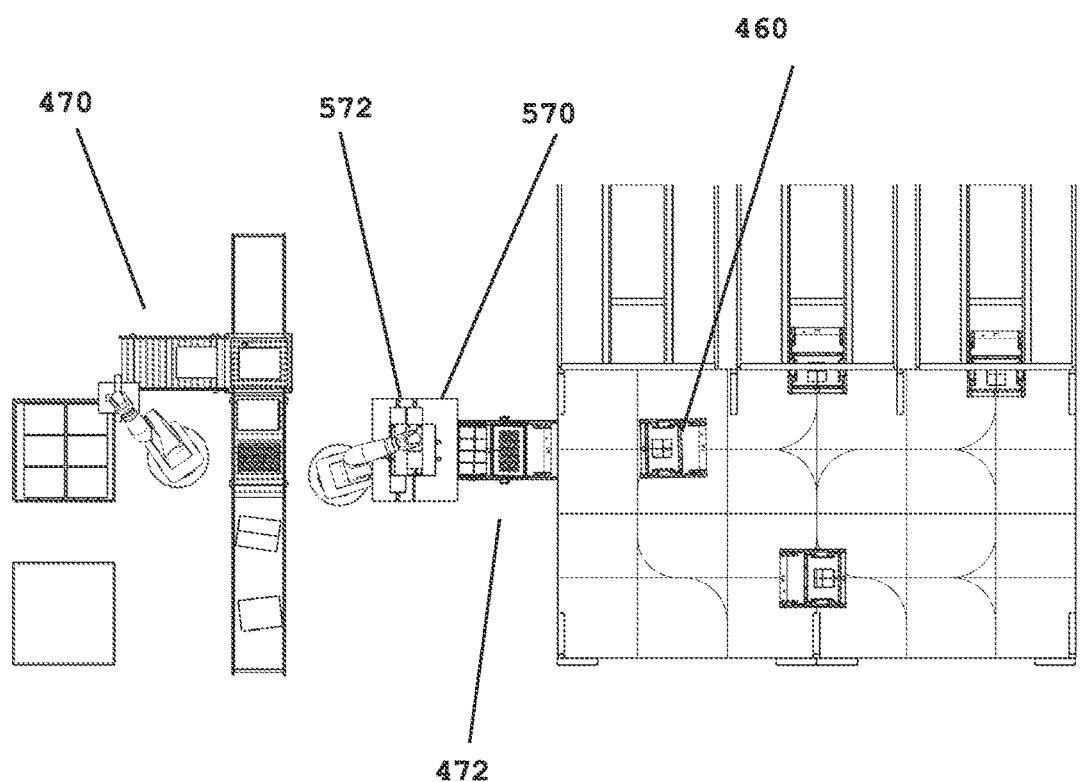

Referring now to FIG. 17A, there is shown an isometric view of an automated decant workstation with a dynamic works station having funnels. Referring also to FIGS. 17B and 17C, there are shown side and plan views of automated decant workstation with a dynamic workstation having funnels. The system shown may have features as disclosed with respect to FIGS. 13A-13C with the addition of a table 570. Here, table 570 has an opening corresponding in size to the opening of the top of the tote. Further, table 570 may have funnels 572 that cover one or more subtote openings in the tote below to prevent placement in the improper subtote. The funnels may be hinged and overlapping such that the funnels may be selectively opened or closed over a given opening. The funnel(s) may be fixed or moveable, for example, as described with respect to the leafs of system 10 but where n funnels would be independently movable to selectively expose any one or more of n subtotes by way of non-limiting example. Providing table 570 helps to prevent placement of eaches outside of the opening that has been selectively exposed.

As noted above, FIGS. 1-3 illustrate an embodiment of an automated decant workstation according to the present technology. FIGS. 18A-20F illustrate a further example of an automated decant workstation according to the present technology. Referring to FIG. 18A, there is shown a plan view of an automated decant workstation 610. Referring also to FIG. 18B, there is shown a side elevation view of automated decant workstation 610. There are two positions 612, 614 where pallets 616 of cases 618 to be decanted are positioned for processing. Only one pallet may be processed at a time, which allows an empty pallet to be replaced with a full pallet while the second pallet is being processed. Pallets supply layers of cases 618 to be processed by the workstation, one SKU at a time; cases of multiple layers can be combined for processing, for example if they are the same SKU, and loading of all of the eaches from a given SKU may be completed before any eaches from a different SKU are loaded.

Pallet Lift 620 may be provided to elevate the input pallet so that the top layer of cases can be transferred onto Case-Singulation Table 622 to be processed. The singulation table feeds cases in single-file onto two conveyors 624, 626, each of which feed cases into case stripping machine 628, 630 that removes the case packaging materials from each case. Once the packaging materials have been removed, the contained eaches can then be manipulated in groups and bulk-loaded into totes and subtotes. First, the eaches move onto Accumulation Table 632, which accumulates eaches 652 of the same SKU from multiple cases. At the opposite end of the accumulation table, sets of eaches are moved one at a time onto a Load-Staging table 634. There they are separated into subtote groupings by a Load Organizer using Divider/Manipulators 636 that mirror the configuration of subtote walls. Dividers 636 may include multiple dividers that are selectively movable and positionable from the sides of the accumulated eaches where some may be moveable vertically and horizontally on a gantry from above to selectably form any suitable pattern of dividers to match the walls of the tote and/or subtotes that the eaches are to be deposited or loaded into.

Figure 20A:
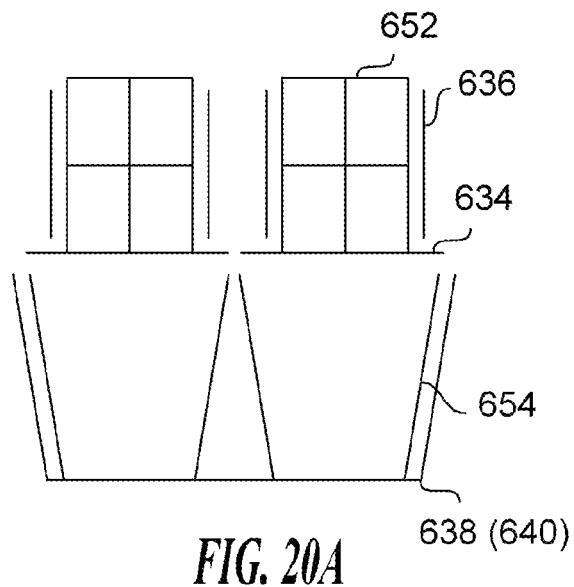
FIGS. 20A-20F are side elevation views of an automated decant system for transferring eaches from a load staging surface to a tote according to embodiments of the present technology.
Figure 20B:
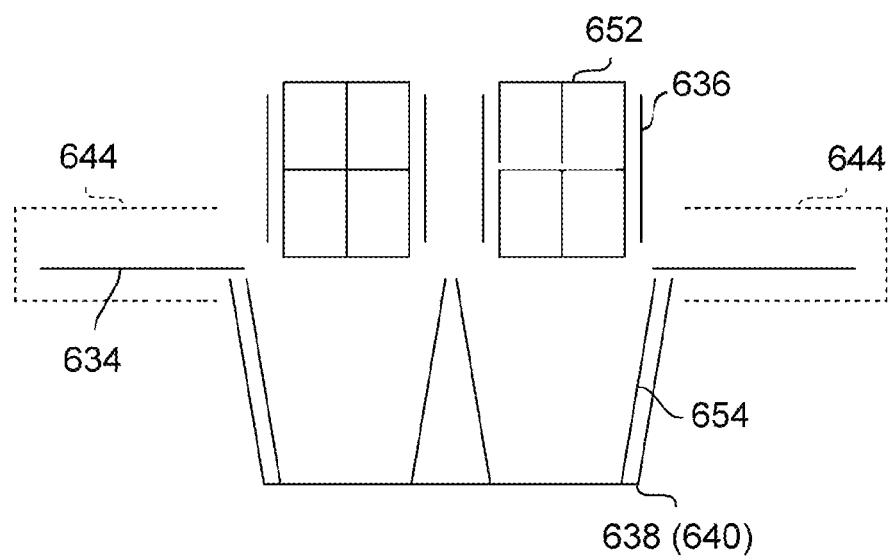
Figure 20C:
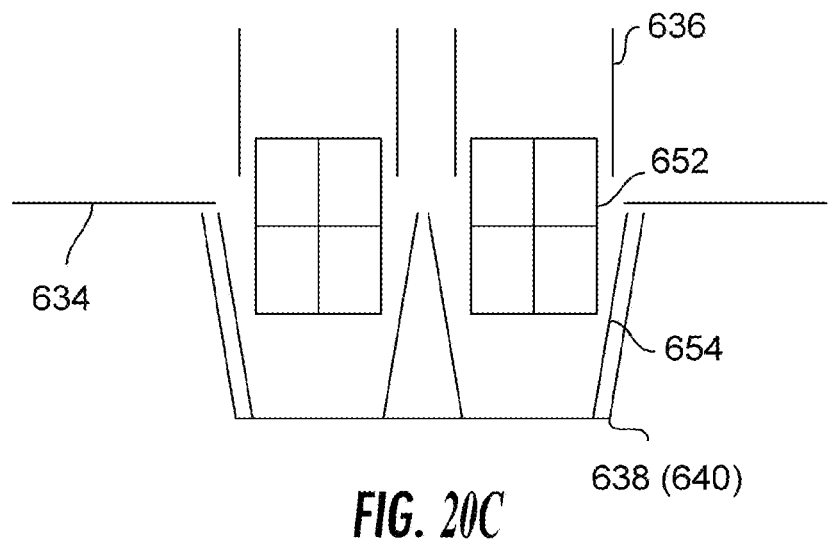
Figure 20D:
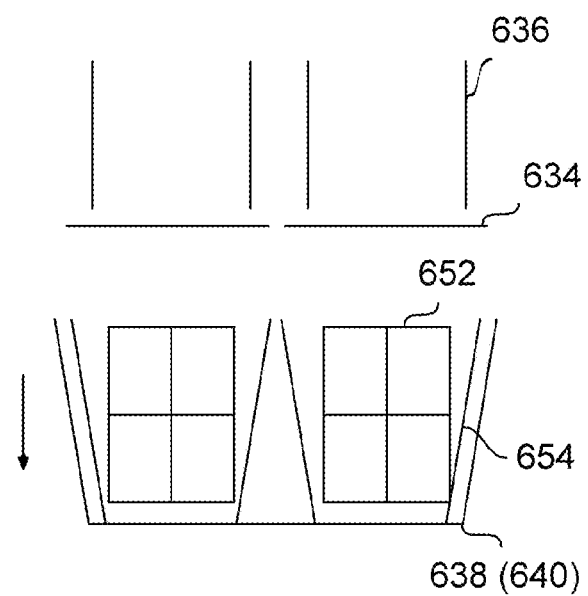
Figure 20E:
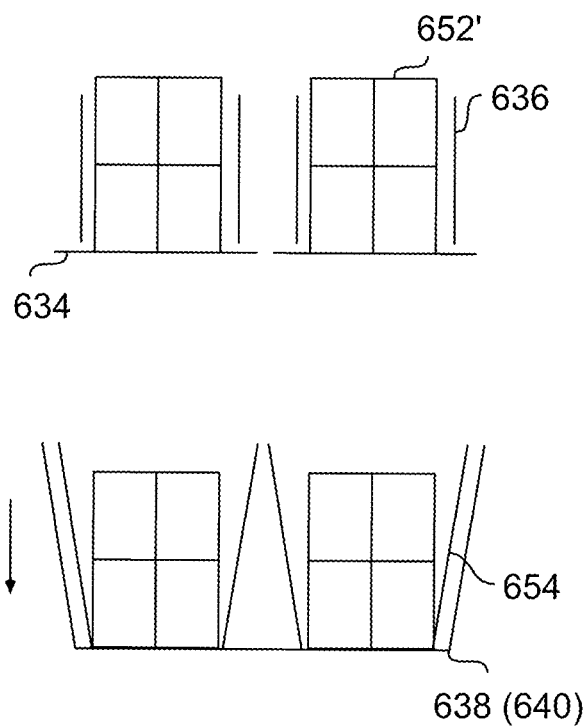

Referring also to FIGS. 20A-20F, directly under the load-staging table is the tote to be loaded 638, supported by a Tote Handler 640 and precisely aligned with the load of eaches, i.e. the subtotes 654 are positioned precisely below the subtote groupings of eaches. Tote handler 640 may be any suitable vertical indexer where position and velocity can be suitably controlled. Tote handler 640 may also positively grasp the tote in the event it needs to exceed >1 g or otherwise. Once the load of eaches is organized properly, the surface 642 of the staging table 634 abruptly disappears very rapidly (far faster than 1 g), while also retracting completely into an adjacent housing 644 as seen in FIG. 20B. Here staging table may be a single table or split as shown. Further staging table 634 may be simply laterally moved very quickly, moved rapidly at a downward angle, or alternately be lowered and then or simultaneously be laterally moved out of the way. Alternately staging table 634 may be hinged horizontally or vertically or otherwise moved out of the way of the dropping eaches. Alternately a multi piece iris may be used. In the event the staging table is moved vertically or otherwise, it may further be perforated to prevent suction from the rapid separation from the eaches. Staging table 634 may be moved by actuators including pneumatic, electric or any suitable actuation. With nothing but air underneath them, the eaches previously supported by the load-staging table now begin to drop at a rate of 1 g as seen in FIG. 20C. As soon as the falling eaches have cleared the plane of the load-staging table, the support surface of that table returns to load position as seen in FIG. 20D, and the next load of eaches 652' begins to be organized immediately as seen in FIG. 20E.

Figure 20F:
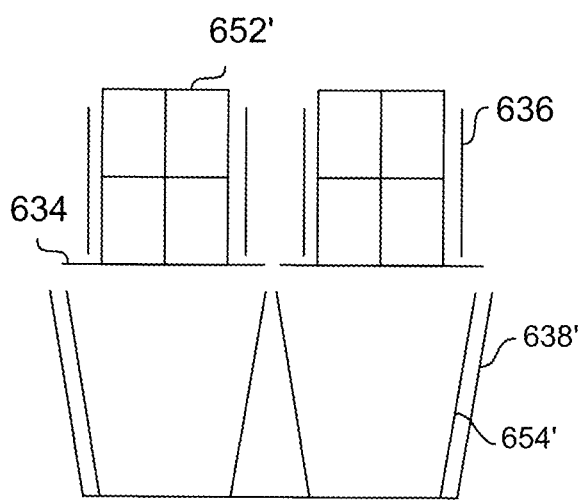
Figure 20F:
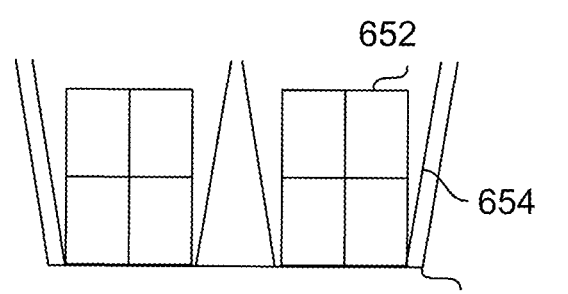

Because walls of the subtotes are aligned precisely with the Divider/Manipulators 636, the falling eaches can only drop straight into the subtotes. As the bottom surfaces of the eaches approach the bottoms of the subtotes, the tote-handler 640 begins dropping the tote, almost-but-not-quite matching the velocity of the dropping eaches. Because there is only a slight difference in speed between the tote and the eaches, the force of impact is only very slight when the bottoms of the eaches encounter the bottoms of the subtotes as seen in FIG. 20E. At that point, the tote decelerates to a gentle stop as seen in FIG. 20F. The result of this sequence is that the tote "catches" the falling eaches very softly, with minimal jostling and collision of the eaches.

The tote-handler 640 brings the tote to a stop between and aligned with the Inbound 648 and Outbound 650 Tote Conveyors (for example, inbound and outbound mobile robots), with transfer mechanisms interfacing those conveyors with the tote handler. If the tote is to receive another layer of eaches in a second load, it would return to the receiving position just under the staging table, and the process would be repeated. Otherwise, the filled tote is transferred onto the outbound conveyor, and an empty tote is transferred onto the tote handler, which returns to the receive position to be loaded. Because the organization of a next load of eaches overlaps in time with the drop-loading of the previous set of eaches, the load cycle can be initiated as soon as the receiving tote 638' is in load position.

Figure 19A:
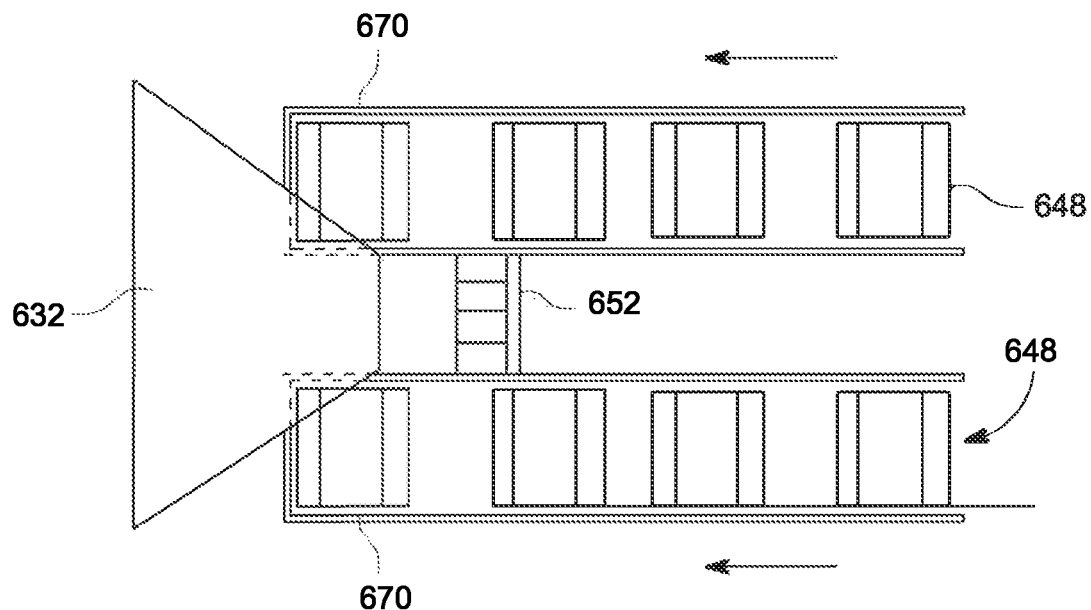
FIGS. 19A-19D are plan views of an automated decant system for transferring eaches from a mobile robot to a tote according to embodiments of the present technology.
Figure 19B:
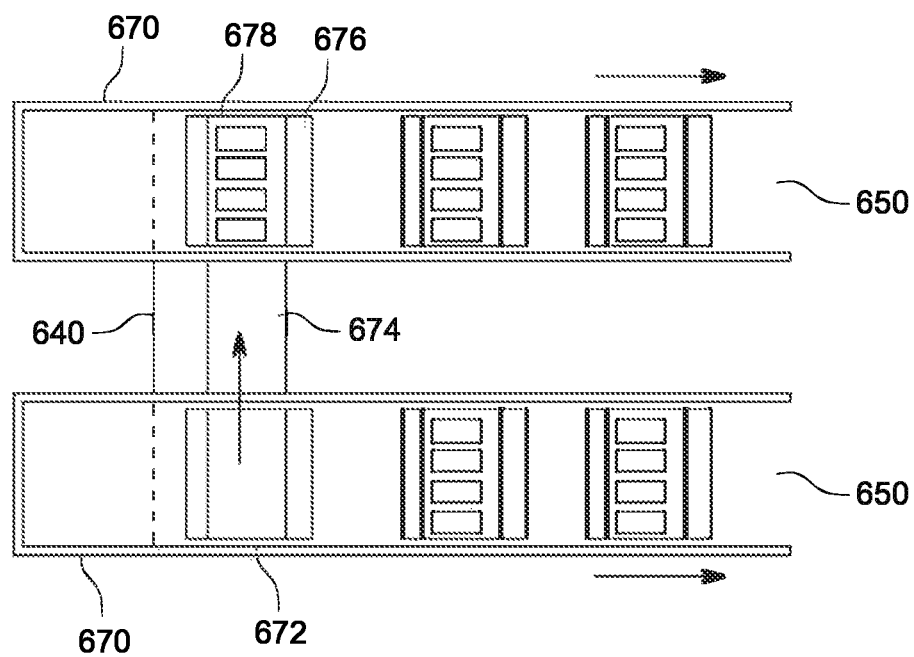
Figure 19C:
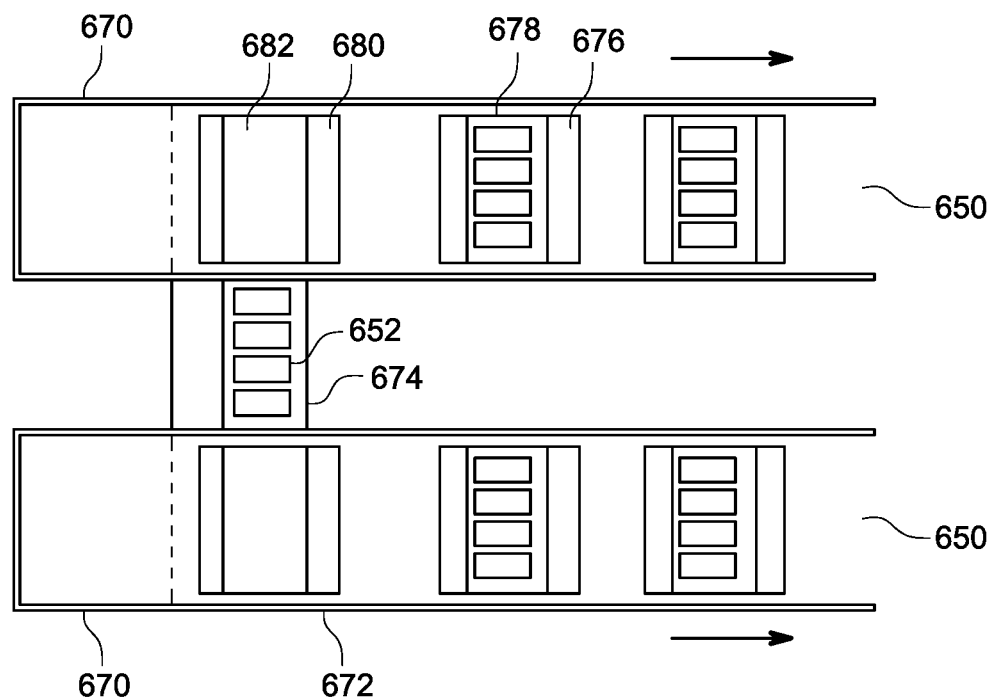
Figure 19D:
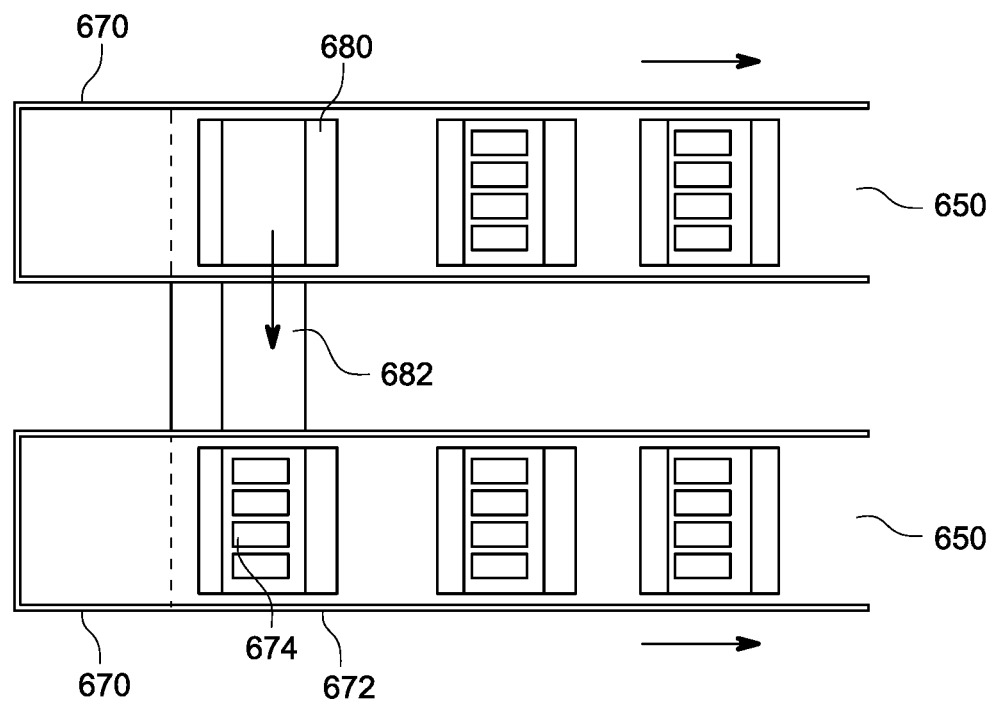

Referring to FIGS. 19A-19D, there is shown an alternate bot to tote handler interface. In FIG. 19A, a partial plan view is shown with inbound bots are shown with empty totes to be filled on an upper level. Here the inbound bots travel to tower 670 to descend to the lower level to deposit empty totes onto the tote handler supporting surface 640. In FIGS. 19B-19D there is also shown a partial plan view with the upper inbound level removed for clarity. In FIG. 19B bot 672 transfers a tote 674 to be loaded onto tote handler 640 substantially simultaneously as Bot 676 removes loaded tote 678 from tote handler 640. In FIG. 19C tote handler 640 ascends to get a batch of eaches 652 as previously described and descends with loaded tote 674 while bot 680 with empty tote 682 arrives. In FIG. 19D bot 680 transfers a tote 682 to be loaded onto tote handler 640 substantially simultaneously as Bot 672 removes loaded tote 674 from tote handler 640. Tote loader then loads eaches into Tote 682 while another bot arrives with an empty tote in the position that departing bot 672 held and the sequence repeats to achieve maximum utilization of the equipment.

As noted, the decant workstation according to the various embodiments described above can be used in a variety of settings, including within an automated storage and retrieval system (ASRS) such as an order fulfillment facility, at least some of which is disclosed in published applications previously incorporated by reference. An example of an ASRS within which the decant workstation according to any of the above-described embodiments may be used will now be explained with reference to FIGS. 21A to 23.

Figure 21A:
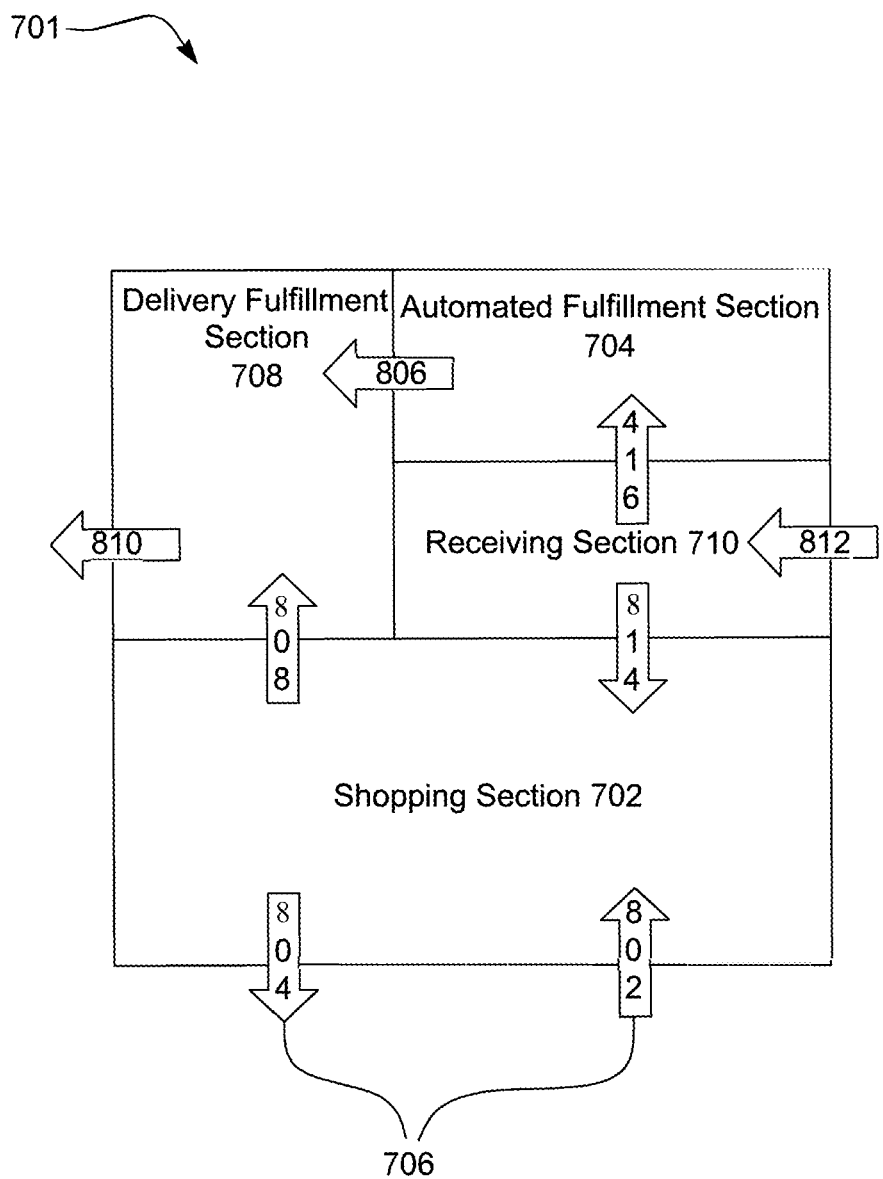
FIGS. 21A, 21B, and 21C are illustrative representations of an internal layout of a store for implementing a decant workstation in accordance with the aspects of the invention.

FIG. 21A depicts a representative conceptual internal layout of the store 701 and how each of the areas of the store 701 relates to one another. In particular, FIG. 21A depicts the shopping section 702, the automated fulfillment section 704, a delivery fulfillment section 708, and a receiving section 710. Although the different areas represented in FIG. 21A are represented within a single plane, the areas can be divided on multiple floors of a store 701, as depicted in FIGS. 3A-3C. During operation of the store 701, all transactions occur through one or more of these areas. In accordance with an example embodiment of the present invention, customers utilize the entrances 706 to enter 802 and exit 804 the shopping section of the store 701. Once inside the shopping section 702 of the store 701, customers can place orders for goods to be fulfilled by the automated order fulfillment section and can shop for non-fungible goods within the non-fungible goods fulfillment section of the store.

Customer orders to be fulfilled by automated order fulfillment will be processed by the automated system within automated fulfillment section 704. When automated order fulfillment has been completed, the automated picked goods will be provided 806 to the delivery fulfillment section 708, as discussed in greater detail herein. Similarly, when customers have completed picking non-fungible goods within the shopping section 702, the customers will provide 808 the goods to the delivery fulfillment section 708, as discussed in greater detail herein. For example, the customers can place a tote or basket with their goods through a window to the delivery fulfillment section 708. At the delivery fulfillment section 708 goods provided 806 from the automated fulfillment section 704 and goods provided 808 from the shopping section 702 will be combined into a single order for delivery 810 to the customer.

Continuing with FIG. 21A, the store 701 can include the receiving section 710 for receiving goods from various suppliers and/or manufacturers. The receiving section 710 can be included within a "back end" of the store that is not seen by customers. When goods are delivered to the receiving section 710 the goods are identified as non-fungible goods for storage within the shopping section 702 or fungible goods for storage within the automated fulfillment section 704. The non-fungible goods will be transferred 814 to the shopping section and stored in a manner to provide non-fungible goods fulfillment. Similarly, the fungible goods will be transferred 816 and stored in a manner suitable for automated order fulfillment (e.g., stored in totes and place into storage rack 712).

Figure 21B:
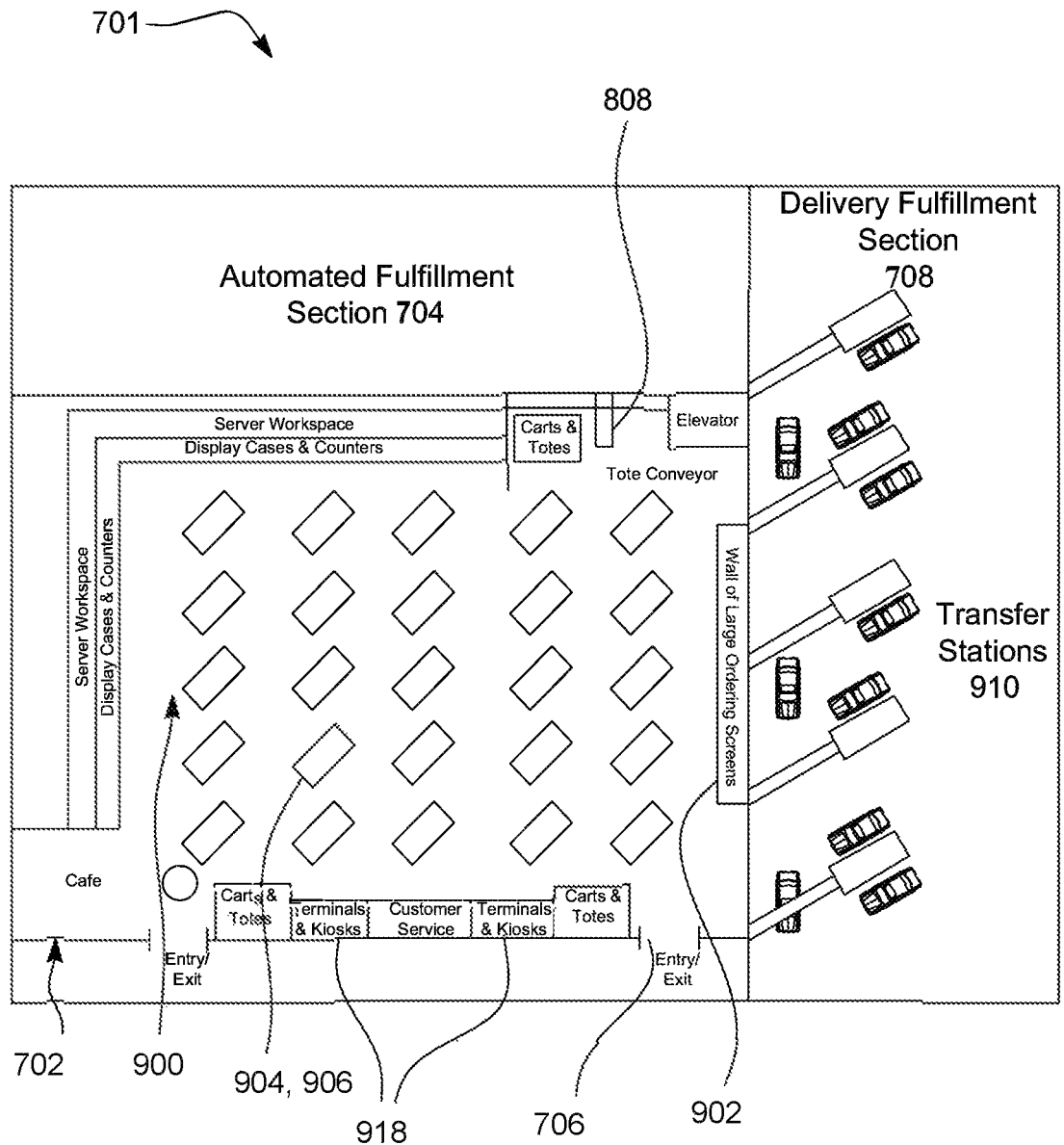

FIG. 21B depicts a more detailed view of the internal structure of the store 701 as discussed with respect to FIG. 21A. In particular, FIG. 21B depicts a detailed view of the shopping section 702, the delivery fulfillment section 708, a plan view of the automated fulfillment section 704, and how those sections relate to one another. The shopping section 702, as depicted in FIG. 21B, includes entry and exit points 706, a mock market 700, and a pass through 808 to the automated fulfillment section 704. The mock marketplace 900 includes a wall of ordering screens 902, a plurality of physical shelving units 904 and display cases of stands 906, and a plurality of shopping terminals and checkout kiosks 918. As would be appreciated by one skilled in the art, the mock marketplace 900 can include any combination of the elements depicted in FIGS. 21B-21C. Additionally, FIG. 21B depicts the delivery fulfillment section 708 of the store 701. The delivery fulfillment section 708 includes a plurality of transfer stations 910 which completed orders of goods are delivered for acceptance by customers.

Figure 21C:
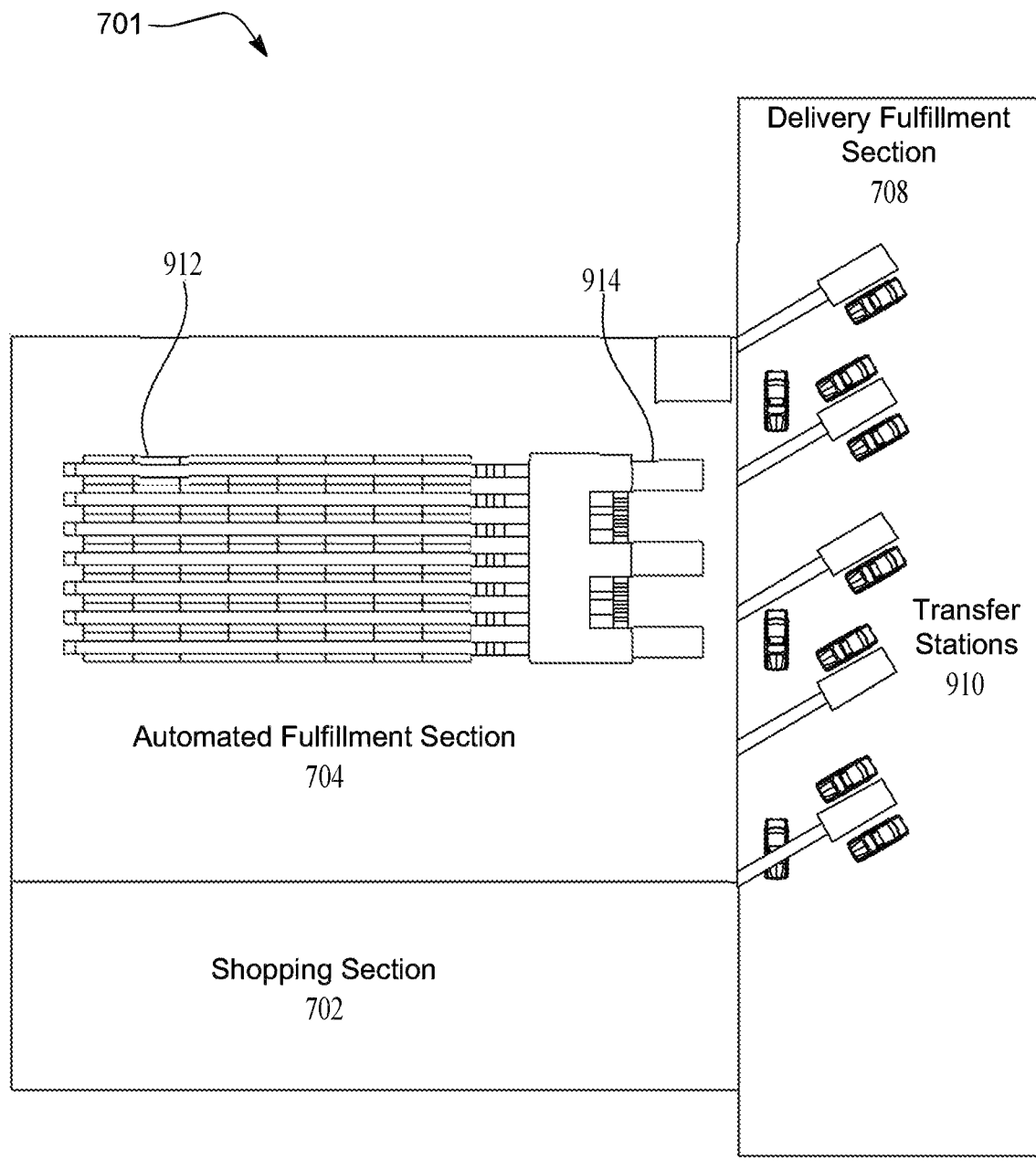

FIG. 21C depicts a more detailed view of the automated fulfillment section 704, the delivery fulfillment section 708, a basic view of the shopping section 702, and how those sections relate to one another. The automated fulfillment section 704 includes the storage rack 912 system configured to hold totes of inventory accessible by mobile robots and further configured to enable the mobile robots to pull inventory totes and deliver the totes to pickers at picking workstations 914 for automated order fulfillment. The delivery fulfillment section 708 includes a consolidation section in which goods from the automated fulfillment section 704 and goods from the shopping section 702 are combined and consolidated into order totes for delivery to customers at the transfer stations 910. As would be appreciated by one skilled in the art, the consolidation can occur within the same physical space as the automated fulfillment section 704 or in a separate physical space.

The store 701 of the automated-service model includes a "front end" including an entry lobby, the shopping section 702 for non-fungible-goods, and associated work areas. As would be appreciated by one skilled in the art, the front end does not necessarily need to be located at a front of the store 701 or on a ground level of the store 701. The vast majority of floor space within the shopping section 702 is devoted to a non-fungible-goods market (e.g., produce, fresh goods and other non-fungible goods) and associated work spaces, which can be the focal point of the store 701 from a customer perspective. The shopping section 702 includes "non-fungible" goods such as produce, meat, seafood, many cheeses (primarily random-weight), deli, floral, bakery, and prepared foods. Typically, non-fungible goods will be sold from display fixtures or cases 906 with as many as three different pricing methods, including but not limited to "random dollar" (fungible with a price barcode), random weight (loose items, especially produce, priced based on item weight), and random count (loose items priced based on number of eaches). These non-fungible goods can also be sold at service counters that offer the customer more opportunity to customize ordered products according to their individual tastes and preferences.

The shopping section 702 of the store 701 is similar in appearance to perimeter departments within traditional self-service grocery stores with technology enhancements, related to the automated-service model, to improve customer convenience and reduce retailer operating costs. The technological improvements for the shopping section 702 are primarily related to how customers shop for goods and exchange funds for those goods. One such technological improvement is the implementation of shopping terminals to be utilized in combination with the automated-service model. The shopping terminals are devices utilized by customers as the primary interface to select, scan, enter, and/or store goods for an order to be placed during shopping trip, including an exchange of funds for the order. In particular, the shopping terminals can be utilized to place orders for both fungible goods (to be picked by the automated order fulfillment section) and non-fungible goods within the non-fungible goods fulfillment section.

As would be appreciated by one skilled in the art, the shopping terminals can be any device configured to identify a particular good (e.g., via scan, photo, etc.) to be added to a shopping list. For example, the shopping terminals can be a portable scanning device or one or more fixed touch screens located within the shopping section 702. Additionally, user devices (e.g., smart phones) of customers can be configured as shopping terminals by executing a mobile application associated with the store 701 on the mobile device. For purposes of this disclosure, the term "shopping terminal" is defined to include an application running on a user device or a standalone specialized shopping terminal device (e.g., portable scanner, stationary screen, or a combination thereof). In operation, the shopping terminal interacts with the customer and communicates with a central automated service system to support a broad set of functions involved in the shopping process. Each shopping terminal has a unique internal identifier that is included in messages, and the process of obtaining a shopping terminal includes a step in which the customer's identity is captured, e.g. via a radio frequency identification (RFID) key fob or an near field communication (NFC) chip in the customer's smart phone, or by entry of information at, e.g., a checkout kiosk 918 or service desk. The shopping terminal associated with the customer is used to pick the items desired for their shopping order to be picked by the automated order fulfillment section and by the customer within the non-fungible goods fulfillment section.

In accordance with an example embodiment of the present invention, the shopping section 702 includes screens 902 representing a virtual fungible-goods market for ordering fungible goods to be picked by automated order fulfillment. In particular, the virtual fungible-goods market combines the order processing and non-fungible goods fulfillment to enable a customer to select an order of goods to be picked by the automated order fulfillment section. In accordance with an example embodiment of the present invention, the shopping section 702 includes a mock marketplace 900 with demo or sample products with SKUs (e.g., empty boxes, pictures, etc.) on physical shelving units (as typically found in a traditional market), or images of such goods made available for browsing of goods (electronic display, or tangible images or illustrations).

Figure 22:
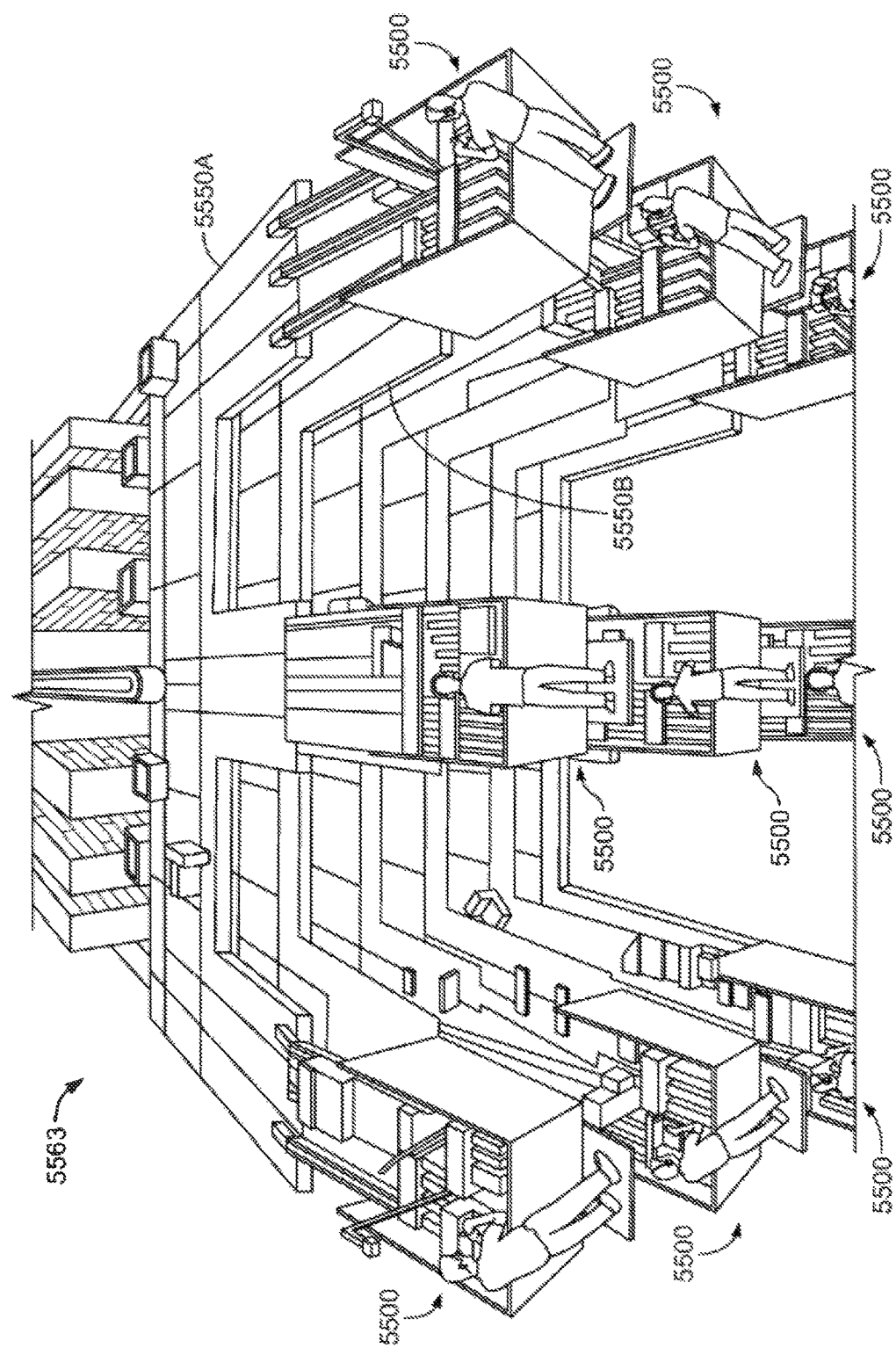
FIG. 22 is a schematic illustration of a portion of storage structure for implementing a decant workstation in accordance with aspects of disclosed embodiments.

Referring now to FIG. 22, an order fulfillment workstation 5500 is shown. While 9 workstations 5500 is shown in FIG. 22 it should be understood that the storage and structure 5563 (which is substantially similar to the storage structures described herein) may have any suitable number of workstations 5500. FIG. 22 illustrates an exemplary configuration of workstations 5500 where at least three workstations 5500 are disposed on each storage level, while in other aspects any suitable number of workstations may be disposed on each storage level. The workstations 5500 for the different levels may be vertically offset from one another such as being stacked one above the other or stacked in a staggered arrangement. In one aspect, each workstation 5500 is communicably connected to two transit decks 5550A, 5550B, while in other aspects each workstation 5500 may be communicably connected to any suitable number of transit decks. In one aspect, each transit deck 5550A, 5550B may correspond to a respective storage level while in other aspects the transit decks 5550A, 5550B may correspond to a common storage level (e.g. there is more than one transit deck associated with each storage/picking level). In another aspect, there may be towers that are located on or otherwise connected to (or disposed within) the transit decks (or aisles) that communicably connect one or more of the transit decks 5550A, 5550B (or aisles) of the different storage levels to from a travel loop with another tower so that bots may travers between the stacked transit decks 5550A, 5550B (or aisles) to any desired/predetermined level of the storage structure. The workstations 5500 are configured to accommodate a picker that transports one or more eaches from a tote (e.g. a P-tote) on one of the bots to a "put" location in a tote (e.g. an O-tote) on another one of the bots. The workstations 5500 may be arrayed at multiple elevations where human or robotic pickers remove eaches from product Totes (P-totes) and place them into either order Totes (O-totes) or a mobile robot, depending on the system configuration and in a manner substantially similar to that described above. A workstation 5500 is disposed at each transit deck level so that bots on each transit deck have access to a workstation 5500. In the exemplary aspect illustrated in FIG. 22 two transit deck levels 5550A, 5550B are shown connected to a common workstation 5500 however, in other aspects any suitable number of transit deck levels may be connected to a common workstation 5500.

Figure 23:
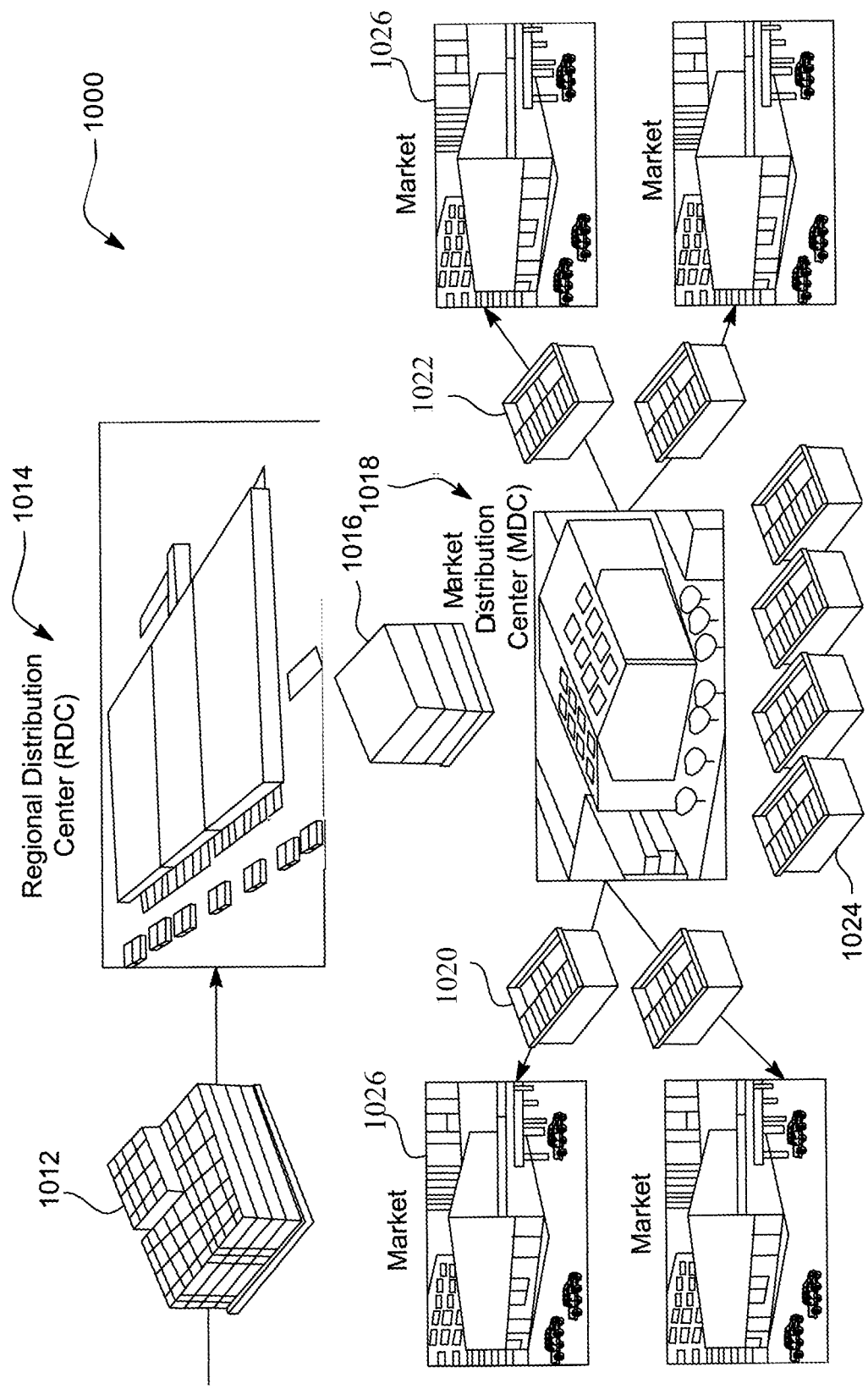
FIG. 23 is an illustrative system for implementing a decant workstation in accordance with the aspects of the embodiments.

In accordance with the disclosed embodiments, an automated retail supply chain 1000 (FIG. 23) enables market inventory reduction, item level traceability and manufacturer consignment. Here, rapid replenishment of SubTotes matched in size to market velocity (rate of sale of eaches) enables market to decrease inventory on-hand, and offer higher number of SKUs in same or smaller facility as opposed to where markets receive eaches in case or breakpack level not matched to their store velocity. Here, eaches are secured in an automated supply chain with full traceability from receiving of pallet from manufacturer at a Regional Distribution Center (RDC) to sale to customer in an order bag. Such an automated supply chain enables a consignment model where the manufacturer may maintain ownership of goods until the point of sale or delivery. Further, the manufacturer has real time visibility of their inventory via a unified commerce engine throughout the entire supply chain process. The manufacturer may also have access to customer trends and data. As seen in FIG. 23, palletized cases of goods 1012 are received at one or more regional distribution center (RDC) 1014 where the regional distribution center supplies palletized mixed cases of goods 1016 to market distribution center (MDC) 1018 where the market distribution center decants and stores like eaches in various sized subtotes 1024 and supplies totes containing mixed each subtotes 1020, 1022 to market 1026 as will be described in greater detail below. As an alternative, shipments may be made to stores or markets in Totes directly from the distribution center with no market distribution center or the function of the regional distribution center and market distribution centers may be combined. The market distribution center enables sufficient scale to afford automated decanting, as well as limits the cost of transporting eaches in totes and subtotes to a localized, for example metropolitan area. The more efficient shipping of eaches in densely pack cases on pallets can be maintained between the regional distribution center and the market distribution center. The market distribution center further offers the capability to store a large selection of goods that a customer may order to be delivered to their market on the next rapid replenishment delivery, that is not regularly stored at the market.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances.

What is claimed is:

1. A system for decanting cases of eaches in a supply chain, the system comprising:
 a work surface configured to receive a case of eaches;
 a separation module configured to receive eaches after removal of the case, the separation module further configured to separate and organize eaches for delivery to one or more totes.

2. The system of claim 1, further comprising a drop catch module configured to support a tote of the one or more totes and for receiving eaches from the separation module.

3. The system of claim 1, further comprising a packaging removal module configured to remove the case after it is cut from the eaches.

4. The system of claim 1, further comprising an inversion module configured to rotate eaches and allow removal of a portion of the case on which the eaches were supported prior to rotation.

5. The system of claim 1, wherein the separation module comprises one or more sliding plates configured to support eaches upon being separated from the case and organized, the one or more sliding plates further configured to be rapidly removed from beneath the eaches to allow the eaches to fall from the separation module without disrupting the organization of the eaches.

6. The system of claim 5, further comprising a drop catch module positioned beneath the one or more sliding plates to catch the falling eaches.

7. The system of claim 6, wherein the drop catch module is configured for vertical motion, the drop catch module moving downward when catching the falling eaches to prevent disrupting the organization of the falling eaches.

8. The system of claim 1, further comprising an edge cutting module configured to make horizontal cuts through the case on one or more sides of the case, wherein the case comprises one of cardboard or shrink wrap.

9. The system of claim 8, wherein the edge cutting module comprises a first edge cutting module configured to make horizontal cuts through two sides of the case, the system further comprising a second edge cutting module configured to make horizontal cuts through the case on remaining sides of the case.

10. The system of claim 9, further comprising a conveyor configured to rotate the case about a vertical axis after the first edge cutting module makes the horizontal cuts through two sides of the case to present the remaining sides to the second edge cutting module for cutting.

11. The system of claim 9, further comprising one or more sensors for sensing at least one of position and contour of the case to facilitate cutting by the first and second edge cutting modules.

12. The system of claim 9, further comprising a case stripper module for removing a top portion of the case after cutting of the case by the first and second edge cutting modules.

13. The system of claim 12, further comprising an inversion module configured to invert the case after removal of the top portion of the case, the case stripper module removing a bottom portion of the case after inversion of the case by the inversion module.

14. A system for decanting cases of eaches in a supply chain, the system comprising:
 a work surface configured to receive a case of eaches;
 one or more edge cutting modules configured to cut one or more edges of the case to provide access to the eaches within the case;
 an inversion module configured to rotate eaches and allow removal of a portion of the case on which the eaches were supported prior to rotation;
 a separation module configured to separate and organize eaches after separation from the case; and
 a drop catch module configured to support a tote and receive eaches from the separation module.

15. The system of claim 14, wherein an arrangement of the eaches within the case is maintained through the one or more cutting modules and the inversion module.

16. The system of claim 15, wherein the organization of the eaches is maintained after the separation and organization of the eaches through the eaches being received in the tote on the drop catch module.

17. The system of claim 14, wherein the one or more edge cutting modules comprise first and second edge cutting modules which together make horizontal cuts through the entire case.

18. The system of claim 17, further comprising a right-angle conveyor configured to rotate the case 90 degrees about a vertical axis after the first edge cutting module makes horizontal cuts through case to present the remaining sides of the case to the second edge cutting module for cutting.

19. The system of claim 14, wherein the one or more edge cutting modules comprise one of a razor edge and router bit for cutting the case without damaging the eaches within the case.

20. The system of claim 19, further comprising one or more cameras for sensing at least one of position and contour of the case to facilitate positioning of the razor edge or router bit to cut the case without damaging the eaches within the case.

21. The system of claim 14, the cameras capture an image of the case to enable identification of a predefined type of case, identification of the predefined type of case facilitating positioning of the razor edge or router bit to cut the case without damaging the eaches within the case.

22. The system of claim 14, wherein the tote comprises two or more subtotes, and wherein the separation module is configured to separate and organize the eaches into groups that correspond in number and position to the two or more subtotes.

23. The system of claim 22, wherein the separation module comprises one or more sliding plates configured to support eaches upon being separated from the case and organized into the groups, the one or more sliding plates further configured to be rapidly removed from beneath the groups of eaches to allow the eaches to fall from the separation module into the two or more subtotes without disrupting the organization of the eaches into the groups.

24. The system of claim 23, wherein the drop catch module is positioned beneath the one or more sliding plates and is configured for vertical motion to move downward when catching the falling eaches to prevent disrupting the organization of the falling eaches from their groups as the eaches fall into the subtotes.

25. A method of decanting cases of eaches in a supply chain, the method comprising:
 a) receiving a case of goods on a support table;
 b) cutting edges of the case;
 c) removing a first portion of the case;
 d) inverting the eaches and remaining portion of the case;
 e) removing the remaining portion of the case;

f) separating the eaches based on one or more totes into which the eaches are to be transferred; and g) transferring the eaches into the one or more totes.

\* \* \* \* \*